United States Patent
Datta et al.

(10) Patent No.: US 12,546,904 B2
(45) Date of Patent: *Feb. 10, 2026

(54) MICRO-STRUCTURED CRYSTALLINE RADIATION DETECTORS

(71) Applicant: Capesym, Inc., Natick, MA (US)

(72) Inventors: Amlan Datta, Ashland, MA (US); Shariar Motakef, Weston, MA (US); John Fiala, Natick, MA (US)

(73) Assignee: CAPESYM, INC., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,091

(22) Filed: Jul. 13, 2022

(65) Prior Publication Data

US 2023/0039378 A1 Feb. 9, 2023

Related U.S. Application Data

(60) Provisional application No. 63/221,235, filed on Jul. 13, 2021.

(51) Int. Cl.
  *G01T 1/00*  (2006.01)
  *G01T 1/29*  (2006.01)
  *G01T 3/06*  (2006.01)

(52) U.S. Cl.
  CPC ............ *G01T 1/003* (2013.01); *G01T 1/2935* (2013.01); *G01T 3/06* (2013.01)

(58) Field of Classification Search
  CPC ......... G01T 1/003; G01T 1/2935; G01T 3/06; G01T 1/201; G01T 1/24; G01T 1/20
  See application file for complete search history.

(56) References Cited

U.S. PATENT DOCUMENTS

| | | | | |
|---|---|---|---|---|
| 5,808,306 A | * | 9/1998 | Skillicorn | G01T 1/202 250/369 |
| 6,172,362 B1 | * | 1/2001 | Lingren | G01T 1/243 250/252.1 |
| 7,022,996 B2 | * | 4/2006 | Matoba | G01T 1/244 250/370.13 |
| 7,372,041 B1 | * | 5/2008 | Nagarkar | G01T 3/06 250/390.11 |
| 7,582,880 B2 | * | 9/2009 | Wallace | G01T 3/06 250/390.11 |

(Continued)

OTHER PUBLICATIONS

Datta Amlan et al: "2D perovskite-based high spatial resolution X-ray detectors", Scientific Reports, vol. 11, No. 1, 77-86,88 Nov. 24, 2021 (Nov. 24, 2021), 8 pages.

(Continued)

*Primary Examiner* — David P Makiya
*Assistant Examiner* — Gisselle M Gutierrez
(74) *Attorney, Agent, or Firm* — Potomac Law Group, PLLC; John (Jack) Penny

(57) ABSTRACT

In one aspect, a radiation detector is disclosed, which includes a substrate having a plurality of microcapillary channels, and a crystalline scintillator material disposed in said channels so as to generate a plurality of independent radiation sensing elements associated with each channel for detecting incident radiation and generating an optical radiation in response to the detection of the incident radiation. In some embodiments, the incident radiation can include any of alpha ($\alpha$), beta ($\beta$), gamma ($\gamma$), X-ray and neutrons.

27 Claims, 33 Drawing Sheets

(56) References Cited

U.S. PATENT DOCUMENTS

| | | | | |
|---|---|---|---|---|
| 8,803,075 | B2* | 8/2014 | Menge | G01V 5/04 |
| | | | | 250/261 |
| 9,182,508 | B2* | 11/2015 | Wallace | G01T 3/06 |
| 9,234,968 | B1* | 1/2016 | Cherepy | G01T 3/06 |
| 9,568,418 | B1* | 2/2017 | Hug | G01N 21/645 |
| 9,899,114 | B2 | 2/2018 | Darbon et al. | |
| 10,399,887 | B2 | 9/2019 | Morse et al. | |
| 10,571,580 | B2* | 2/2020 | Brabec | G01T 1/2018 |
| 10,753,863 | B1* | 8/2020 | Hug | G01J 3/2803 |
| 11,693,135 | B1 | 7/2023 | Sosa et al. | |
| 2011/0024642 | A1* | 2/2011 | Tredwell | G01T 1/2019 |
| | | | | 438/66 |
| 2011/0211675 | A1* | 9/2011 | Ramsden | G01T 1/40 |
| | | | | 378/207 |
| 2014/0328465 | A1* | 11/2014 | Herrmann | G01T 1/2985 |
| | | | | 250/361 R |
| 2015/0323683 | A1* | 11/2015 | Vasilyev | G01T 3/06 |
| | | | | 250/269.1 |
| 2015/0369928 | A1* | 12/2015 | Reese | H10K 85/20 |
| | | | | 250/362 |
| 2016/0131769 | A1* | 5/2016 | Wieczorek | G01T 1/24 |
| | | | | 250/369 |
| 2016/0206255 | A1* | 7/2016 | Gagnon | G01T 1/00 |
| 2017/0097425 | A1 | 4/2017 | Shedlock et al. | |
| 2018/0172846 | A1* | 6/2018 | Lam | G01T 1/20185 |
| 2018/0329080 | A1* | 11/2018 | Brabec | G01T 1/202 |
| 2020/0209414 | A1 | 7/2020 | Birowosuto et al. | |
| 2021/0025837 | A1* | 1/2021 | Goran | H01J 37/28 |
| 2022/0326399 | A1 | 10/2022 | Brodsky et al. | |
| 2023/0107565 | A1* | 4/2023 | Datta | G01T 1/2935 |
| | | | | 250/367 |

OTHER PUBLICATIONS

International Invitation to Pay Additional fees and Partial Search Report, PCT/US2022/036843, dated Sep. 30, 2022, 18 pages.
International Search Report and Written Opinion, PCT/US2022/036843, dated Nov. 21, 2022, 24 pages.
Maddalena Francesco et al: "Deterministic Light. Yield, Fast Scintillation, and Microcolumn Structures in Lead Halide erovskite Nanocrystals", The Journal of Physical Chemistry C, vol. 125, No. 25, Jun. 18, 2021 (Jun. 18, 2021), pp. 14082-14088.
International preliminary Report on Patentablity for PCT/US2022/036843 dated Jan. 25, 2024.

* cited by examiner

Dispersing one or more precursor materials including a radiation-detecting material or a precursor thereof into a plurality of microcapillary channels Processing the precursor materials to cause formation of a plurality of independent radiation detecting elements, where each of the radiation detecting elements is associated with one of the microcapillary channels

FIG. 9

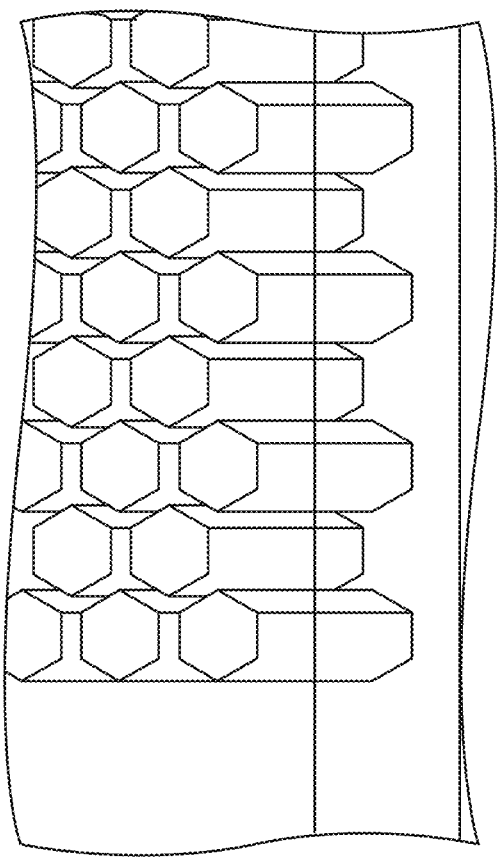
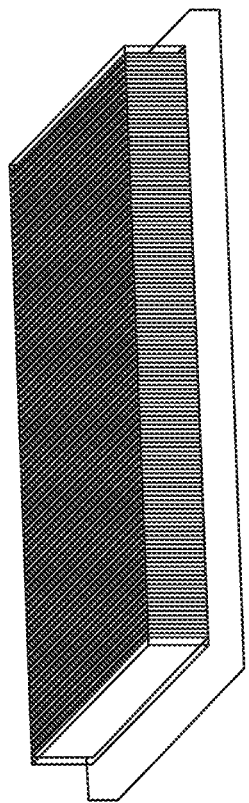
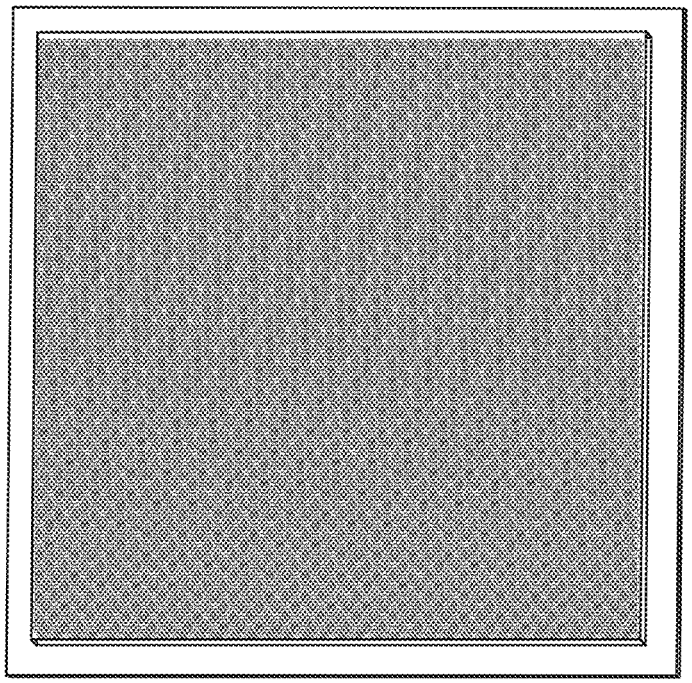
FIG. 11B
FIG. 11C
FIG. 11A

MICRO-STRUCTURED CRYSTALLINE RADIATION DETECTORS

RELATED APPLICATION

The present application claims priority to provisional patent application No. 63/221,235 titled "Micro-structured crystalline radiation detectors," filed on Jul. 13, 2021, the content of which is herein incorporated by reference in its entirety.

TECHNICAL FIELD

The present disclosure is generally directed to radiation detectors, and in particular to such radiation detectors that employ a plurality of microcapillary structures having scintillator or semiconductor radiation-detecting materials to detect incident radiation.

BACKGROUND

The present application relates generally to radiation detectors and methods for their fabrication, where the radiation detectors can be utilized to detect a variety of ionizing and non-ionizing radiation.

X-ray imaging is a widely-used diagnostic technique that spans numerous fields. X-rays interact with atomic electrons resulting in higher absorption cross-sections for higher atomic number elements depending on the overall electron density distribution of the object. X-ray radiography is currently performed primarily using direct and indirect techniques, which involve the detection of charge carriers and photons generated by the X-rays, respectively. Indirect flat panel X-ray imagers (FPXIs) with scintillating layers (such as commercially available micro-columnar CsI and $Gd_2O_2S$) have high detection quantum efficiency (DQE) and are the preferred detectors for all hard X-ray imaging applications. These sensors, however, provide poor spatial resolutions and suffer from low detection sensitivity.

Direct detectors can be used to achieve a higher spatial resolution but charge trapping and defects typically result in a significant reduction of their sensitivity. Due to their lower atomic numbers, large area direct detectors such as a-Se and Si detectors have low efficiencies for the detection of higher X-ray energies.

Accordingly, there is a need for radiation detectors that exhibit both a high spatial resolution as well as a high detection efficiency.

SUMMARY

In one aspect, a radiation detector is disclosed, which includes a plurality of microcapillary structures, and a scintillator material associated with each microcapillary structure so as to generate a plurality of independent radiation sensing elements each associated with one of the microcapillary structures for detecting incident radiation and generating scintillation radiation in response to the detection of the incident radiation. Each of the microcapillary structures can be in the form of a channel that is at least partially (and typically fully) filled with the scintillator material.

In some embodiments, the incident radiation can include any of alpha ($\alpha$), beta ($\beta$), gamma ($\gamma$), X-ray and neutrons.

In some embodiments, the scintillator material can have a single crystalline composition (structure) or a polycrystalline composition (structure). In other embodiments, the scintillator material can have an amorphous composition (structure).

A variety of scintillator materials can be used in a radiation detector according to the present teachings. By way of example, in some embodiments, the scintillator material includes any of an organic and inorganic scintillator material. In some such embodiments, the scintillator material can include an organic-inorganic hybrid scintillator material. Some examples of such organic-inorganic hybrid scintillator materials include, without limitation, any of 0D, 1D, 2D, or 3D perovskite material. By way of example, the perovskite material can be PEALPB.

Some examples of inorganic scintillator materials suitable for use in a radiation detector according to the present teachings can include, without limitation, $Cs_3Cu_5I_5$, CsI, and CLLB.

In some embodiments, the scintillator material can be an oxide scintillator. Some examples of such oxide scintillators can include, for example, any of BGO and $Gd_2O_2S$.

In some embodiments, the scintillator material can include a halide scintillator material. Some examples of such a halide scintillator material can include, without limitation, an inorganic, an organic and hybrid organic-inorganic scintillator material.

In some embodiments, the microcapillary structures are formed within a substrate. In some embodiments, the substrate can be formed of any of glass and quartz. In some embodiments, the substrate can be formed of a metal, such as lead (Pb) and tungsten (W). In some embodiments, the substrate can be formed of a polymeric material. By way of example, and without limitation, the polymeric material can be a scintillating or a non-scintillating plastic material. By way of example, in some embodiments, the plastic material can be PTFE (polytetrafluoroethylene). In some embodiments, the substrate can be formed of a scintillating PVT plastic. By way of example, the scintillator material of which the substrate is formed can be suitable for the detection of a radiation modality different than the radiation modality that can be detected via the scintillator material associated with the microcapillary structures.

In some embodiments in which the substrate is formed of a scintillator material, the scintillator material of which the substrate is formed can be different from the scintillator material associated with the microcapillary structures. By way of example, and without limitation, the substrate can be formed of a scintillator material that is suitable for detection of one radiation modality (e.g., X-rays) while the scintillator material in the microcapillary channels of the microcapillary structures can be suitable for the detection of a different radiation modality (e.g., neutrons).

Some examples of such scintillator materials suitable for use in forming the substrate can include, without limitation, LYSO:Ce or PWO. In some embodiments, the substrate can include a ceramic scintillator. Some examples of a ceramic scintillator material can include, without limitation, any of LuAG:Ce or YAP:Ce.

In some embodiments in which the substrate is formed of a scintillator material, such a scintillator material can have any of a single crystalline, a polycrystalline or an amorphous structure.

As noted above, in some embodiments, the scintillator material in the microcapillary structures or the scintillator material from which the substrate is formed can have any of a single crystalline structure, a polycrystalline structure, or a combination of a single crystalline and a polycrystalline structure. For example, the scintillator material associated with at least one of the microcapillary structures (typically all of the microcapillary structures) can have a single crystalline composition. In some embodiments, the scintillator material associated with at least one of the microcapillary structures (typically all of the microcapillary structures) can have a polycrystalline composition. In some embodiments, the scintillator material associated with at least one of the microcapillary structures (typically all of the microcapillary structures) can have a mixed single and poly-crystalline composition.

In some embodiments, the scintillator material that is associated with each of the radiation sensing elements can have a thickness in a range of about 20 microns to about 5 centimeters, e.g., in a range of about 50 microns to about 1 millimeter, or in a range of about 10 millimeters to about 1 cm. Further, in such embodiments, the scintillator material can have a maximum transverse dimension in a range of about 1 micron to about 3 mm, e.g., in a range of about 10 microns to about 1 mm, or in a range of about 50 microns to about 200 microns.

In some embodiments, at least one of the microcapillary structures extends across an entire thickness of the substrate from a proximal end thereof to a distal end (herein also referred to as first and second ends). In some embodiments, the scintillation radiation generated in response to the detection of incident radiation can exit the microcapillary structures through any of its proximal and distal ends.

In some embodiments, the microcapillary structures are formed as channels filled entirely with the scintillator material. In other embodiments, at least some of the microcapillary channels may be only partially filled with the scintillator material.

In some embodiments, a radiation detector according to the present teachings can exhibit a modulation transfer function (MTF) of at least 5% for spatial frequencies in a range of zero and about 8 lp/mm for detection of X-ray radiation. In some embodiments, a radiation detector according to the present teachings can exhibit a modulation transfer function (MTF) of at least 5% for spatial frequencies in a range of zero and about 8 lp/mm for detection of gamma-ray radiation. In some embodiments, a radiation detector according to the present teachings can exhibit a modulation transfer function (MTF) of at least 5% for spatial frequencies in a range of zero and about 8 lp/mm for detection of neutrons. In some embodiments in which the radiation detector exhibits MTF values in the above ranges, the scintillator material associated with each of the radiation-detecting elements can have a maximum transverse dimension in a range of about 1 micron to about 200 microns.

In some embodiments, the substrate of a radiation detector according to the present teachings can include, e.g., be formed of, a material that exhibits an index of refraction that is greater than an index of refraction of the scintillator material at the frequency of the scintillation radiation such that the scintillation radiation generated in each of the radiation sensing elements is substantially trapped within that sensing element via internal reflections at interfaces between the scintillator material and the substrate material.

In some embodiments, at least one of the microcapillary channels associated with one of the microcapillary structures includes a coating layer covering at least a portion of an inner surface thereof for enhancing optical isolation between said at least one channel and an adjacent channel. In some such embodiments, the coating layer can be capable of absorbing the scintillation radiation that is generated by the scintillator material in response to the detection of the incident radiation. By way of example, and without limitation, the coating layer can include any of a metal and a metal oxide. By way of example, the coating layer can include (e.g., be formed of) any of gold, silver, $MgO_2$, $BaSO_4$, and $Al_2O_3$. As discussed in more detail below, in some embodiments, the coating layer can absorb the scintillation radiation (or at least a portion thereof) and emit radiation at a longer wavelength.

In some embodiments, the radiation detector can include a support substrate to which a substrate in which the microcapillary structures are formed is coupled. In some embodiments, such a support substrate can include (e.g., be formed of) any of semiconductor and glass. In some embodiments, the support substrate can include a fiber optic plate. By way of example, the fiber optic plate can include any of glass and a polymer. In some embodiments, the microcapillary structures can be in the form of free-standing structures that are held together via suitable means, e.g., optical glue or epoxy, PMMA (polymethylmethacrylate), which can form a light guide, among others.

In some embodiments, at least one of the microcapillary structures includes a coating layer covering at least a portion of an inner surface thereof for enhancing optical isolation between that microcapillary structure and an adjacent one. In some such embodiments, the coating layer can be a reflecting layer that reflects the scintillation radiation back into the scintillator material of the microcapillary structure. In some embodiments, the coating layer can be formed of metal or a metal oxide layer. By way of example, the metal layer can be formed of gold or silver. Some examples of suitable oxide coating materials can include, without limitation, any of $MgO_2$, $BaSO_4$, and $Al_2O_3$.

In some embodiments, at least one of the microcapillary structures can include an inner insulting layer and an outer reflective layer disposed on an inner surface thereof.

In some embodiments, the coating layer can be an absorbing layer that can absorb the scintillation radiation and emit radiation at a longer wavelength.

In some embodiments, at least two of the microcapillary structures include two different scintillator materials. The two scintillator materials can be suitable for detecting two different radiation modalities. By way of example, one of the radiation modalities can include any of X-ray and γ radiation and the other radiation modality can include neutrons. In some embodiments, the two different scintillator materials may be selected to allow detection of radiation in two different energy regimes. In some such embodiments, an optical imager that is optically coupled to the radiation detector can generate radiation image data that can be processed to generate a mixed image of the different radiation modalities. In other words, one portion of the image can correspond to one of the radiation modalities and another portion of the image can correspond to another radiation modality.

In some embodiments, one or more of the radiation sensing elements can include a high-Z matrix scintillator that can provide information regarding the energy of the detected γ rays and one or more of the other radiation sensing elements can include a low-Z matrix scintillator, but ultrafast scintillator material, that can provide information regarding the timing of the detection of the gamma radiation. As an example, the high-Z matrix scintillator can provide the gamma energy information, while the low-Z but ultrafast scintillator can provide timing information regarding the detection of the incident radiation.

In a related aspect, a radiation detector is disclosed, which includes a plurality of radiation sensing elements, where each of the radiation sensing elements includes a hollow microcapillary channel, and a scintillator material filling at least a portion of the inner lumen of said microcapillary channel. Each of the radiation sensing elements is configured to receive incoming radiation such that at least a portion of the incoming radiation is incident on the scintillator material, which generates scintillation radiation in response to detection of the radiation.

The microcapillary structures can include an inlet and an outlet aperture through at least one of which the scintillation radiation can be collected from the microcapillary structure.

In some embodiments, the radiation detector can further include a supporting substrate to which the plurality of radiation sensing elements are coupled. In some embodiments, the microcapillary structures can be formed within a substrate (e.g., by forming microcapillary channels within the substrate and at least partially filling those channels). In some embodiments, the microcapillary structures can be in the form of free-standing structures that are held together via suitable means, e.g., optical glue, epoxy, or a polymer that is transparent to the scintillation light.

In some embodiments, the microcapillary structures can have a length in a range of about 20 microns to about 5 centimeters, e.g., in a range of about 50 microns to about 1 millimeter, or in a range of about 10 millimeters to about 1 centimeter, or any other subrange encompassed by the range of about 20 microns to about 5 centimeters. Further, the microcapillary channels can have a maximum transverse dimension (e.g., a diameter in case of cylindrical microcapillary channels) equal to or less than about 3000 microns, e.g., in a range of about 10 microns to about 200 microns.

In some embodiments, the radiation sensing elements are distributed as multiple stacked layers. In some such embodiments, the radiation sensing elements within one layer are configured for preferential detection of one radiation modality and the radiation sensing elements within another layer are configured for preferential detection of another radiation modality. For example, the radiation sensing elements within one layer can detect X-ray or γ radiation and the radiation sensing elements within another layer can detect neutrons.

In a related aspect, an imaging system is disclosed, which includes a radiation detector for generating scintillation radiation in response to the detection of an incoming radiation and an optical imager that is coupled to the radiation detector so as to receive the scintillation radiation to generate image data corresponding to the detected radiation. The radiation detector can be any of the radiation detectors described herein. By way of example, the radiation detector can include a substrate supporting a plurality of microcapillary channels, and a scintillator material that at least partially fills the microcapillary channels so as to generate a plurality of independent radiation sensing elements associated with each microcapillary channel for detecting incident radiation and generating scintillation radiation in response to the detection of the incident radiation.

In some embodiments, the optical imager includes a plurality of imaging pixels each optically coupled to one of the radiation sensing elements to receive the scintillation radiation generated by that sensing element and generate one or more imaging signal(s) in response to detection of the scintillation radiation. The imaging system includes a circuitry electrically connected to the optical imager to process the imaging signals generated by the optical imager and process the imaging signals to generate an image of the incident radiation. In some embodiments, the optical imager can include an array of photon-counting energy-sensitive photodetectors. By way of example, such photodetectors include silicon photomultipliers (SiPMs) and photomultiplier tubes (PMTs). Examples of high spatial resolution SiPMs include linearly graded SiPM arrays available from FBK. Examples of high spatial resolution PMTs include multi-anode PMTs manufactured by Hamamatsu Photonics of Japan.

In a related aspect, a radiation detector is disclosed, which includes a plurality of microcapillary channels, and a semiconductor material filling (at least partially) said channels so as to generate a plurality of independent radiation sensing elements each of which is associated with one of the channels for detecting incident radiation via generation of electrical charges (electron-hole pairs). The semiconductor material can partially, or fully, fill the microcapillary channels.

Each of the microcapillary channels includes a plurality of electrodes for collecting the electron-hole pairs for generating one or more electric signals (e.g., an electric current) in response to detection of the incident radiation. By way of example, in some embodiments, each of the electrodes includes an electrically conductive layer (e.g., a metallic layer) that at least partially coats a top and a bottom surface (e.g., top and bottom ends) of the semiconductor material associated with a radiation sensing element so as to be in electrical contact with the semiconductor material. In some embodiments, an inner surface of a respective one of the channels can be coated with a cathode and an anode electrode (which electrodes are electrically insulated from one another) such that the electrodes are in electrical contact with the semiconductor material.

In some embodiments, at least one of the microcapillary channels includes an electrically insulating coating layer that covers at least a portion of an inner surface thereof. By way of example, such an insulating coating layer can function as a passivating layer helping reduce the dark current associated with the semiconductor material. In some embodiments, the coating layer can include (e.g., be formed of) an oxide material, such as silicon oxide. In some embodiments, at least one of the microcapillary channels can have an inner passivating layer (e.g., an inner silicon oxide layer) and an outer electrically conductive layer (e.g., a gold layer) coating an inner surface thereof.

In some embodiments, the semiconductor material can have any of a single- or a poly-crystalline structure. In some embodiments, the semiconductor material can have an amorphous structure.

By way of example and without limitation, the substrate material can include any of glass, a polymer and a ceramic material, among others.

Any suitable semiconductor material can be employed for forming the radiation detector. Some examples of suitable semiconductor materials include, without limitation, silicon (Si), germanium (Ge), GaAs, among others.

In some embodiments, each of the microcapillary channels can include an aperture through which the incident radiation can reach the semiconductor material. Such an aperture can be positioned at one or both ends or between the two ends along the microcapillary structures. In some embodiments, incident radiation can penetrate through the walls of the microcapillary structures to reach the semiconductor material. In some embodiments, the charge-collecting electrodes are coupled to the proximal and the distal ends of the semiconductor material to generate electrical signals in response to the detection of the incident radiation.

In some embodiments, each of the microcapillary channels includes a pair of electrodes each in the form of an electrically conductive layer coating a portion of the inner surface of the microcapillary channel, e.g., extending between two opposed ends of the microcapillary channel. The two conductive electrodes can be insulated from one another so as to allow one of them to function as a cathode electrode and the other one to function as an anode electrode. By way of example, the conductive coating can be formed of a metal, such as gold or silver.

In some embodiments, at least one, and typically all of the microcapillary channels, are entirely filled with the semiconductor material. In some embodiments, one or more of the microcapillary channels may be only partially filled with the semiconductor material.

In some embodiments, the radiation detector exhibits a modulation transfer function (MTF) of at least 5% for detection of incident radiation, e.g., radiation in the visible portion or infrared portion of the electromagnetic spectrum, at a spatial frequency in a range of zero and about 8 lp/mm.

In a related aspect, a radiation detector is disclosed, which includes a plurality of radiation sensing elements each comprising: a hollow microcapillary channel, and a semiconductor filling at least partially a lumen of the microcapillary channel, where each of the radiation sensing elements is configured to receive incident radiation such that at least a portion of the incident radiation is received by the semiconductor material, which generates one or more electrical signals in response to the detection, and generally proportional to the energy, of the received incident radiation.

In some embodiments, each of the microcapillary channels includes a pair of electrodes for collecting electron-hole pairs generated in the semiconductor material associated with that microcapillary structure in response to detection of the incident radiation.

In some embodiments, the radiation detector can further include a supporting substrate to which said plurality of radiation sensing elements are coupled.

In a related aspect, a radiation detector is disclosed, which includes a plurality of microcapillary structures, wherein said microcapillary structures are at least partially filled with a radiation detecting material so as to provide a plurality of independent radiation sensing elements such that each of the radiation sensing elements is associated with one of said microcapillary structures for detecting incident radiation and generating one or more signals in response to the detection of the incident radiation. In some embodiments, the radiation detecting material can have any of a single- and poly-crystalline structure. In some embodiments, the radiation detecting material can have an amorphous structure.

In some embodiments, the radiation detecting material can include a first scintillator material that is configured to generate scintillation radiation in response to detection of the incident radiation. By way of example, the incident radiation can be any of $\alpha$, $\beta$, $\gamma$, X-ray and neutrons.

In some embodiments, the scintillator material can include any of an organic, an inorganic and an organic-inorganic hybrid scintillator material. By way of example, the organic-inorganic hybrid scintillator material comprises any of 0D, 1D, 2D or 3D perovskite material.

In some embodiments, the microcapillary structures are formed in a substrate. In some such embodiments, the substrate can include (e.g., be formed of) a second scintillator material. The first and the second scintillator materials can be different. For example, the first and the second scintillator materials can be suitable for the detection of different radiation modalities and/or the detection of radiation in different energy regimes.

In some embodiments, the substrate can include a material exhibiting an index of refraction greater than an index of refraction of the scintillator material at a frequency associated with the scintillation radiation such that the scintillation radiation generated in each of said sensing elements is substantially trapped within that sensing element via internal reflections at interfaces between said scintillator material and said substrate material.

In some embodiments, at least one of the channels can include a coating layer covering at least a portion of an inner surface thereof for enhancing photon generation in response to the incoming radiation and enhancing optical isolation between said at least one channel and an adjacent channel. An example of such a coating layer includes $^6$LiF.

In some embodiments, at least one of the microcapillary structures can include a wavelength shifting material coating at least a portion of an internal surface thereof.

In some embodiments, the plurality of microcapillary structures can include at least two subsets having different scintillator materials.

In some embodiments, the plurality of radiation sensing elements are distributed in two or more stacked layers. In some such embodiments, the radiation sensing elements associated with at least two of said layers include different scintillator materials.

In some embodiment, an optical imager is coupled to said independent radiation sensing elements to receive the scintillation radiation to generate an image corresponding to the incident radiation. By way of example, the image can exhibit a modulation transfer function (MTF) of at least 5% for a spatial frequency in a range of zero to about 8 lp/mm for detection of the incident radiation.

In some embodiments, the radiation detecting material can include a semiconductor material, wherein said semiconductor material is configured to generate electric charges in response to detection of the incident radiation. Each of the microcapillary structures can include a plurality of electrodes for collecting the electric charges generated by the semiconductor in response to detection of the incident radiation. The plurality of electrodes associated with each of said microcapillary structures can include an anode electrode and a cathode electrode electrically coupled to opposed ends of the microcapillary structure.

In some embodiments, the plurality of electrodes can include an electrically conductive layer coating at least a portion of an inner surface of a respective one of said microcapillary structures and being in electrical contact with the semiconductor material associated with that microcapillary structure.

In some embodiments, at least one of said microcapillary structures can include a passivating, electrically insulating layer coating at least a portion of an inner surface thereof for reducing dark current associated with the semiconductor material.

In some embodiments, at least one of the microcapillary structures can include an inner electrically insulating layer and an outer electrically conductive layer coating at least a portion of an inner surface thereof.

In some embodiments, the microcapillary structures are formed in a substrate. By way of example, and without limitation, the substrate can include any of glass, polymer, ceramic, metal or semiconductor material.

By way of example and without limitation, the semiconductor material can include any of silicon, Germanium (Ge), Cadmium Zinc Telluride (CdZnTe), Cadmium Telluride (CdTe), Mercuric iodide ($HgI_2$), Bismuth Triiodide ($BiI_3$), Thallium Bromide (TlBr), and Hybrid Perovskites such as Cesium Lead Bromide ($CsPbBr_3$), Methylammonium Lead Bromide ($MAPbBr_3$), Methylammonium Lead Iodide (MAPbI$_3$), Formamidinium Methylammonium Cesium Lead Bromo-iodide (FAMACs).

The radiation detector can include a detection and analysis circuitry that is electrically coupled to said radiation detecting elements for receiving the electrical signals generated by the electrodes of said radiation detecting elements and analyzing the electrical signals to generate an image of the incident radiation.

In some embodiments, the radiation detector and said detection and analysis circuitry are configured such that said image exhibits a modulation transfer function (MTF) of at least 5% for a spatial frequency in a range of zero to about 8 lp/mm for detection of said incident radiation. By way of example, in some such embodiments, the maximum transverse dimension of the microcapillary structures can be in a range of about 10 microns to about 200 microns.

In another aspect, a method of making a radiation detector is disclosed, which includes dispersing one or more precursor materials including a radiation-detecting material or a precursor thereof into a plurality of microcapillary channels formed in a substrate; and processing the precursor materials to cause formation of a plurality of independent radiation sensing elements each associated with one of the microcapillary channels. In some embodiments, the microcapillary channels can have a maximum transverse dimension less than about 3000 microns, e.g., in a range of about 10 microns to about 3000 microns, such as in a range of about 20 microns to about 1000 microns, or in a range of about 50 microns to about 500 microns or in a range of about 100 microns to about 200 microns, and a length in a range of about 20 microns to about 5 centimeters, such as in a range of about 100 microns to about 3 cm, e.g., in a range of about 500 microns to about 2 cm, or in a range of about 1 mm to about 4 cm.

In some embodiments, each of the crystalline radiation-sensing elements includes a single crystalline structure. In some embodiments, at least one of the crystalline radiation-sensing elements includes a polycrystalline structure. In some embodiments, at least one of the crystalline radiation-sensing elements includes a mixture of a single and a polycrystalline structure.

In some embodiments, the step of dispersing the one or more precursor materials into the microcapillary channels includes introducing a liquid containing the one or more precursor materials into the microcapillary channels. The liquid can be introduced into the microcapillary channels via any of drop casting, dip coating, full or partial dipping, spraying, and ink jet printing.

In some embodiments, the liquid is introduced into the microcapillary channels via a capillary action. In some embodiments, the introduction of the liquid into the microcapillary channels includes drop casting the liquid into the microcapillary channels at a slanted substrate orientation. By way of example, the substrate can be slanted at an angle in a range of about 10° to about 45°.

In some embodiments, the radiation-detecting material can include at least one of a scintillator material and a semiconductor material. By way of example, and without limitation, the scintillator material can be PEALPB.

In some embodiments, the processing of the one or more precursor materials to cause crystallization thereof can include using one or more of: solvent evaporation, antisolvent-assisted crystallization, inverse temperature crystallization, vertical gradient temperature freezing, horizontal gradient temperature freezing, heat exchanger method growth, gas-assisted crystal growth, thermal quenching, and polymerization.

In some embodiments, the step of dispersing the one or more precursor materials into the microcapillary channels comprises introducing a liquid containing said one or more precursor materials into said microcapillary channels. The liquid is introduced into the microcapillary channels via any of drop casting, dip coating, full or partial dipping, spraying, and ink jet printing. In some embodiments, the liquid is introduced into the microcapillary channels via a capillary action. In some embodiments, the liquid is introduced into the microcapillary channels via drop casting the liquid into the microcapillary channels at a slanted substrate orientation.

In some embodiments in which the microcapillary structures are formed in the substrate, the liquid is introduced into the substrate by placing the substrate at a slanted angle relative to a source of liquid. By way of example, the angle can be in a range of about 10° to about 45°.

In some embodiments, the radiation-detecting material includes at least one of a scintillator material and a semiconductor material. A variety of scintillator and semiconductor materials, including those described herein, can be employed for fabricating a radiation detector according to the present teachings. By way of example, the scintillator material can include PEALPB. By way of example, the semiconductor can include any of silicon, germanium, and GaAs.

In some embodiments, the step of processing the one or more precursor materials comprises causing crystallization thereof using at least one of the following techniques: solvent evaporation, antisolvent-assisted crystallization, inverse temperature crystallization, vertical gradient temperature freezing, horizontal gradient temperature freezing, heat exchanger method growth, gas-assisted crystal growth, thermal quenching, and polymerization.

The processing step can include using a solution-based technique to cause crystallization of the precursor materials. The processing step can include using directional evaporation of a solvent containing the precursor materials to cause crystallization of the precursor materials, where the directional evaporation of the solvent is facilitated by changing any of temperature of the precursor materials and a pressure to which the solvent is exposed.

In some embodiments, the processing step includes using antisolvent-assisted crystallization of the precursor materials. The antisolvent can be introduced into the microcapillary channels at a rate and a volume suitable for initiating and sustaining crystallization of the precursor materials in the microcapillary channels. In some embodiments, the antisolvent can be introduced into the microcapillary channels at a rate and a volume suitable for initiating and sustaining crystallization of the precursor materials in the microcapillary channels. In some embodiments, the processing step can include using inverse temperature crystallization to cause crystallization of the precursor materials. In some embodiments, the processing step can include using a polymerization technique for causing crystallization of the precursor materials.

In some embodiments, the processing step can include using a melt-based technique for causing crystallization of the precursor materials. In some embodiments, the processing step includes using directional gradient temperature freezing for causing crystallization of the precursor materials. In some embodiments, the processing step can include using a heat exchange growth method for causing crystallization of the precursor materials. In some embodiments, the processing step includes using a gas-assisted crystal growth technique to cause crystallization of the precursor materials. In some embodiments, the processing step includes using thermal quenching to cause crystallization of the precursor materials.

In some embodiments, the processing step includes using physical vapor deposition for growing the radiation sensing materials in the microcapillary channels.

In some embodiments, the processing step includes using thermal evaporation to cause formation of the radiation detecting materials in the microcapillary channels. In some embodiments, the processing step includes using a sputtering technique to cause formation of the radiation detecting materials in the microcapillary channels. In some embodiments, the processing step includes using atomic layer deposition for forming the radiation detecting materials in the microcapillary channels. In some embodiments, the processing step includes using chemical vapor deposition for forming the radiation detecting materials in the microcapillary channels.

In some embodiments, the maximum transverse dimension of the microcapillary structures can be in a range of approximately 1 µm through 3 mm, e.g., in a range of about 1 µm to about 1 mm, or in a range of about 10 µm to about 200 µm.

Further understanding of various aspects of the present teachings can be obtained by reference to the following detailed description in conjunction with the associated drawings, which are described briefly below.

BRIEF DESCRIPTION OF THE DRAWINGS

FIG. 9 is a flow chart listing various steps in a method according to an embodiment for fabricating FIGS. 10A-10C schematically depict fabrication of an example of a dual imaging detector by introducing a solution containing PEALPB (FIG. 9A) into a plurality microcapillary channels (FIG. 9B) and causing the crystallization of the PEALPB to generate a single-crystalline PEALPB scintillators (FIG. 9C), FIGS. 11A-11C show the simulation results generated using Geant 4 software of borosilicate glass faceplate with 100 µm hexagonal capillaries filled with PEALPB similar to the microcapillary plates shown in FIGS. 10A-10C, where FIG. 12A shows light generation without a microcapillary plate and FIG. 12B shows the same with the microcapillary plate, FIG. 13 schematically depicts the architecture of an imager that was employed for simulating performance of an embodiment of a radiation detector according to the present teachings for detection of neutrons.

DETAILED DESCRIPTION

Figure 1A:
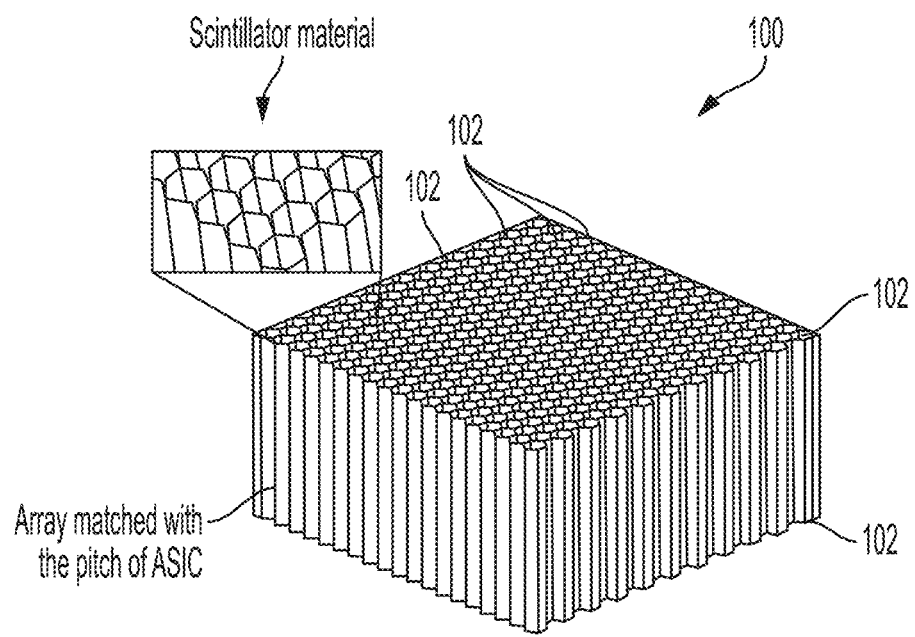
FIG. 1A schematically depicts a radiation detector according to an embodiment of the present teachings in which a scintillator material is employed for detecting incoming radiation.

The present disclosure relates to radiation detectors for detecting electromagnetic and/or particle radiation, which can generate light or electric charge in response to the detection of the incident radiation, as well as radiation detecting systems in which such radiation detectors are incorporated. By way of example, the radiation detectors according to the present teachings can be employed to detect $\alpha$-, $\beta$-, $\gamma$-, X-rays, and neutrons, or other ionizing or non-ionizing radiation.

As discussed in more detail below, in some embodiments, such a radiation detector can employ a scintillator material or a semiconductor material to generate light or electric charge, respectively, in response to detection of incident radiation. In embodiments, such a radiation detector can include a matrix of microcapillaries (herein also referred to as microcapillary structures) in which a radiation sensing material (herein also referred to as a radiation detecting material) is disposed, that is, the microcapillaries are partially or fully filled with the radiation sensing material. By way of example, in some embodiments, the radiation sensing material disposed in the microcapillaries can be in the form of a single crystal. In other embodiments, the radiation sensing material can have a polycrystalline or an amorphous composition. In some embodiments, all of the microcapillary structures can include the same radiation-detecting material while in other embodiments different subsets of the microcapillary structures can include different radiation-detecting materials.

The cross-sectional size of the microcapillaries (e.g., a maximum transverse size in a plane perpendicular to the longitudinal axis of the microcapillaries) can be typically in a range of about 1 micrometer (micron) to about 3 millimeters. In embodiments, the use of such microcapillaries can allow the detectors to exhibit a high spatial resolution. In particular, in many embodiments, the present disclosure provides highly scalable non-hygroscopic detectors that demonstrate an excellent spatial resolution. For example, in some embodiments, the spatial resolution of a radiation detector according to the present teachings can be comparable to or better than that of direct X-ray detectors.

The radiation detectors according to the present teachings can be employed in a variety of different applications including medical and industrial imaging, homeland security, materials research, among others. By way of example, the microcapillary-structured radiation detectors according to the present teachings can be employed to fabricate low-cost, large-area ultrahigh spatial resolution high frame rate imagers.

In some embodiments, the spatial resolution of a radiation detector can be characterized by its modulation transfer function (MTF). As known in the art, an MTF provides a quantitative measure of the spatial frequency response of an imaging system. In some embodiments, a radiation detector according to the present teachings can exhibit an MTF of at least about 5%, e.g., in a range of about 5% to about 100%, for spatial frequencies in a range of zero to about 8 lp/mm (line pairs per millimeter) for detection of any of X-ray, gamma-ray radiation, or neutrons. As used herein, the term MTF when used in connection with a scintillator radiation detector is intended to refer to the combined MTF of the radiation detector and an optical imager (e.g., CMOS or CCD optical imager) that is optically coupled to the radiation detector to receive and detect the scintillation radiation, where the optical imager exhibits a pixel pitch of at least about 5 microns. As used herein, the term MTF when used in connection with a semiconductor radiation detector is intended to refer to the MTF of an image obtained using the semiconductor radiation detector and electronic circuitry employed to process electrical signal(s) generated by the semiconductor detector to form the image.

Spatial resolution is an important factor for X-ray imaging for distinguishing between two adjacent features in an image. By way of example, a detector with a high MTF can reliably detect a micron-scale cancerous lesion or a millimeter-scale fracture in a gas pipeline with high levels of confidence. While the trend of the imaging industry is shifting towards feature recognition using artificial intelligence, higher spatial resolutions in radiography images can significantly enhance the detection probabilities of subtle features such as pulmonary nodules using the neural network deep learning models.

In addition to spatial resolution, the indirect detectors must provide high enough contrast, be manufacturable in large areas (>10 cm×10 cm), have a fast decay time, and have a low afterglow.

Various terms are used herein consistent with their ordinary meanings in the art unless specifically modified or further explained herein. By way of further explanation, the term "microcapillary," or "microcapillary structure," refers to a material structure that extends between a proximal end and a distal end along a longitudinal axis and has a maximum size in a transverse dimension (i.e., a direction that is orthogonal to the longitudinal axis) that is equal to or less than about 3 mm, e.g., in a range of about 1 micron to about 1 mm, such as in a range of about 10 microns to about 200 microns, or in a range of about 200 microns to about 500 microns, or in a range of about 500 microns to about 1 mm. The term "microcapillary channel" as used herein refers to a material structure providing an inner lumen that can be filled at least partially with a radiation-detecting material to form a microcapillary structure.

A microcapillary channel extends from a proximal to a distal end and has a maximum size in a transverse dimension (i.e., a dimension that is orthogonal to the longitudinal axis, e.g., assuming that the longitudinal axis extends along the Z-axis of a Cartesian coordinate system, the transverse dimension will be in a plane perpendicular to the Z-axis, such as X- or Y-axis) that is equal to or less than about 3 mm, e.g., in a range of about 1 micron to about 1 mm, such as in a range of about 10 microns to about 200 microns, or in a range of about 200 microns to about 500 microns, or in a range of about 500 microns to about 1 mm. A microcapillary structure refers to such a microcapillary channel whose lumen has been at least partially filed with a radiation-detecting material (e.g., a scintillator material or a semiconductor material).

The terms "single crystal," or "single crystalline structure," or "single crystalline composition" are used herein interchangeably to refer to a solid material that can be characterized by a crystal lattice that includes at most three crystal grains, and more preferably only a single crystal gain with no grain boundaries, such that the crystal lattice is continuous and unbroken over the entire, or least over more than 50% or more than 60%, or more than 70% of more than 80% or more than 90%, of the volume of the solid material.

The terms "polycrystal," or "polycrystalline structure," or "polycrystalline composition" are used herein interchangeably to refer to a solid material that is composed of a plurality of single crystal domains that are randomly oriented relative to one another, where the number of crystal domains exceed three.

The term "amorphous" as used herein refers to any noncrystalline solid in which the atoms and/or molecules of the solid are not organized in a definite lattice pattern. An example of an amorphous solid is glass.

The term "scintillator material" refers to a material that can provide detectable photons in the visible range of the electromagnetic spectrum following passage of incident radiation, as that term is described herein, through the material. The term "scintillation radiation" refers to the photons in the visible range provided by the scintillator material.

The term "optical radiation" refers to radiation in the wavelength range of about 200 nm to about 750 nm.

The term "about" as used herein to modify a numerical value is intended to indicate a variation of at most 10%, or at most 5% around that numerical value. The term "substantially" as used herein is intended to indicate a deviation, if any, of at most 10%, or at most 5%, relative to a complete state and/or condition.

As discussed in more detail below, in some embodiments, the radiation detecting material employed in a radiation detector according to the present teachings can be a scintillator material in which an ionizing photon (e.g., an X-ray or γ-ray) or a particle (e.g., neutron) impinging on the scintillator material creates scintillation radiation in the form of a number of photons (e.g., optical photons) through different mechanisms, such as band-to-band excitation and relaxation, activator mediated scintillation, self-strapped exciton (STE) scintillation, bound exciton, defect-generated scintillation, among others).

In some embodiments, the radiation detecting material employed in a radiation detector according to the present teachings can be a semiconductor material (herein also referred to as a semiconducting material) in which impinging radiation creates electron-hole pairs that move under the influence of an applied electric field towards an anode and a cathode, respectively, (the holes move towards the cathode and the electrons move towards the anode) to be collected, thereby generating one or more electric signals indicative of the detected radiation. The radiation detectors disclosed herein can detect and measure continuous radiation as well as pulsed radiation, e.g., sub-picosecond radiation pulses, among others.

In some embodiments, a radiation detector according to the present teachings provides an excellent solution for high spatial resolution X-ray radiography. In some such embodiments, the detector can include a solution-processable two-dimensional (2D) hybrid perovskite single-crystal scintillator, lithium-alloyed phenethylammonium lead bromide (PEALPB) incorporated into a glass microcapillary array. In terms of crystal structure, hybrid (containing organic and inorganic constituents) perovskite scintillators can be classified as three-dimensional (3D) and two-dimensional (2D). Although the 3D perovskite scintillators with lower exciton binding energy (tens of meV) have been shown to provide excellent X-ray scintillator response, the 2D perovskite scintillators have the potential for providing higher light yield and faster decay due to their higher exciton binding energy (hundreds of meV).

The 3D lead halide perovskites can be transformed into a 2D one by introducing a long alkyl chain or a bulky organic cation. PEALPB belongs to the 2D family, where the alternating inorganic/organic layers effectively confine the exciton inside the inorganic layer generating scintillation radiation in response to X-rays, fast neutrons, and a particles that are released as a byproduct of thermal neutron absorption by Li.

Li-doping provides a unique benefit for perovskite materials. Even though the solution-processed hybrid perovskites have demonstrated excellent performance in many applications, a high concentration of trap states with a density of $10^{15}$-$10^{16}$ cm$^{-3}$ still exists, resulting in nonradiative recombination. It has been experimentally verified that this deleterious feature can be significantly reduced when the lattice is doped with high concentrations of Li.

It is possible to synthesize the 2D scintillators with high concentrations of $^6$Li due to the small size of the Li-ion relative to the large unit cell of 2D materials. Li-alloying also broadens the radioluminescence emission spectra of PEALPB, with its maximum at 436 nm. Li-doping also substantially increases the light yield of the PEALPB scintillators.

As discussed further in the Examples section below, the light yield of free-standing single-crystal PEALPB sensors according to certain embodiments was found to be around 18700±1200 ph/MeV as measured using $^{137}$Cs gamma source. The data demonstrates that radiation detectors according to embodiments of the present teachings can provide a high detection efficiency for radiation imaging applications.

In addition, the presence of $^6$Li provides a large capture cross-section for the detection of thermal neutrons, while the high concentration of hydrogen (24 hydrogen atoms/molecules) enables the detection of fast neutrons. Thus, by adjusting the content of $^6$Li in the matrix, these detectors can also be tuned to detect neutrons over a wide range of energies. Accordingly, the present teachings regarding radiation detectors are also applicable to detectors that are suited for the detection of neutrons.

Figure 1B:
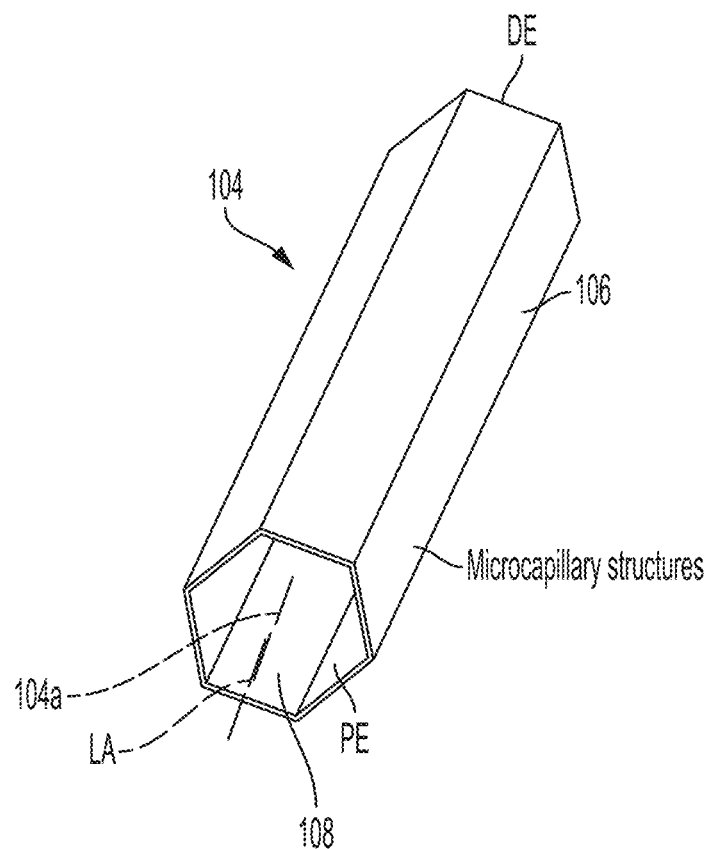
FIG. 1B is a schematic perspective view of a sensing module utilized in the radiation detector illustrated in FIG. 1A.
Figure 1C:
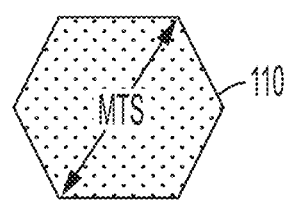
FIG. 1C is an end view of a sensing module utilized in the radiation detector illustrated in FIG. 1A, further schematically illustrating a scintillator material filling the lumen of the sensing module, FIG. 1D schematically depicts a sensing module having a non-uniform cross-sectional shape characterized by a conical end, FIG. 2 schematically depicts a radiation detector according to an embodiment in which a plurality of radiation sensing modules are supported by a supporting substrate, FIG. 3 schematically depicts that a light ray generated by a scintillator material of a sensing module can undergo multiple reflections at the peripheral surfaces of the sensing module to be guided to at least one end of the sensing module for detection via an optical imager that is optically coupled to that end.

With reference to FIGS. 1A, 1B and 1C, a radiation detector 100 according to an embodiment of the present teachings includes a plurality of radiation sensing modules 102 (herein also referred to as radiation sensing elements or simply sensing elements or sensing modules) that are arranged relative to one another to collectively form the radiation detector 100 for detecting incident radiation. Each sensing module 102 includes a microcapillary structure 104 that extends from a proximal end (PE) to a distal end (DE) along a longitudinal axis (LA). The proximal and distal ends can provide apertures 104a and 104b. As discussed in more detail below, in some embodiments, the proximal and distal apertures 104a/104b allow collecting light (scintillation radiation) or electric charges generated by a radiation detecting material associated with the microcapillary structure 104 in response to detection of incident radiation.

In this embodiment, each microcapillary structure 104 includes a peripheral wall 106 that encloses an inner lumen 108. The term "inner lumen" is used herein to refer to the empty space that is circumscribed by the peripheral wall 106 of a microcapillary structure. The inner lumen 108 is partially (and typically completely) filled with a radiation sensing material 110. While in this embodiment the radiation sensing material substantially fills the entire inner lumen of the microcapillary channel of a microcapillary structure (i.e., it substantially fills the entire volume of the inner space of the microcapillary structure from its proximal end to its distal end), in other embodiments the radiation sensing material may partially fill the inner lumen of the microcapillary structure. In this embodiment, the peripheral wall 106 of the microcapillary structure includes six facets that are positioned at an angle relative to one another such that the microcapillary structure exhibits a hexagonal cross-sectional shape in a plane perpendicular to its longitudinal axis.

The peripheral wall 106 can be formed of any suitable material. By way of example and without limitation, the peripheral wall 106 of the microcapillaries can be formed of a polymeric material, such as plastic materials, e.g., PTFE (polytetrafluoroethylene). In other embodiments, the peripheral wall can be formed of a metal such as, Pb or W. In yet other embodiments, the peripheral wall can be formed of glass or quartz.

In some embodiments, the peripheral wall 106 of one or more microcapillary structures can itself be formed of a radiation-detecting material, e.g., a scintillator material or a semiconductor material. In some embodiments, the microcapillary structures are formed in a substrate as a plurality of channels that are filled at least partially with the radiation-detecting material and the substrate itself is formed of a radiation-detecting material (e.g., a scintillator material or a semiconductor material). By way of example, the substrate can be formed of a material that is more suitable for the detection of a radiation modality different than the radiation modality that is preferentially detected by the scintillator material associated with the microcapillaries. For example, the microcapillaries can be filled with an X-ray sensitive scintillator material and the substrate can be formed of a neutron sensitive scintillator material.

In some embodiments, the incident radiation can reach a radiation detecting material of a microcapillary structure of a radiation sensing module via passage through at least one of the peripheral wall 106, the proximal and the distal apertures 104a/104b or a combination of the peripheral wall and one or more of the proximal and the distal apertures.

Figure 2:
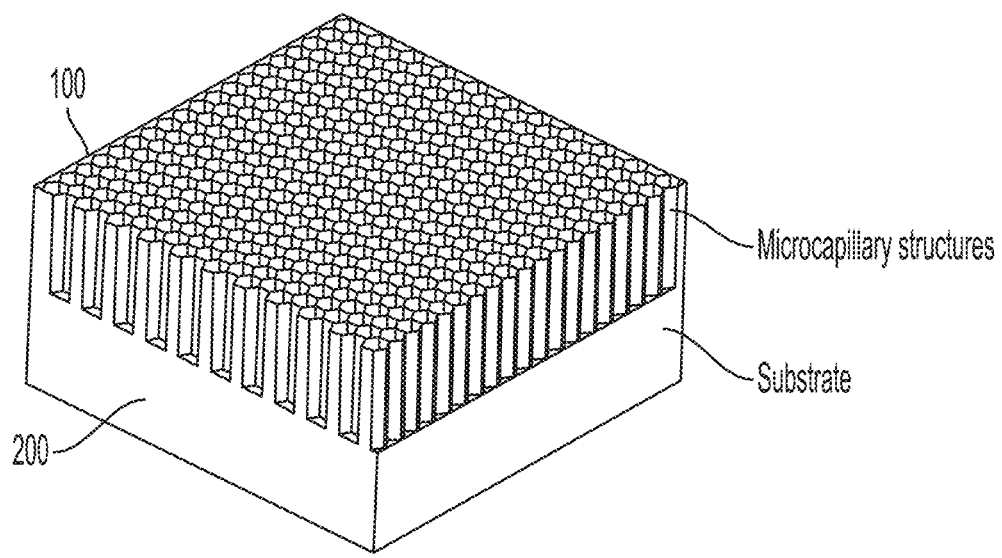

As shown in FIG. 2, in some embodiments the microcapillary structures 100 are supported by an underlying substrate 200 (herein also referred to as a supporting substrate). In some such embodiments, the microcapillary structures and the supporting substrate form a unitary structure. By way of example and without limitation, in some embodiments, such a unitary structure can be formed via generating channels (holes) (e.g., via drilling, etching, or otherwise) in a solid substrate such that each channel extends from a top surface of the substrate towards a bottom surface thereof without reaching the bottom surface. In other embodiments, the microcapillary structures and the supporting substrate may be formed as two separate units that are attached to one another, e.g., via optical glue, epoxy, or a polymer that is transparent to the scintillation light.

As discussed further below, in embodiments in which the radiation sensing material is a scintillator material, the faceted peripheral wall of the microcapillary structure can be effective in channeling the light generated by the scintillator material in response to the detection of incident radiation along the length of the microcapillary structure, e.g., via total internal reflections at the facets of the peripheral wall.

In this embodiment, the radiation sensing material associated with the microcapillary structure 104 is a scintillator material that can generate light in response to the detection of incident radiation, e.g., in response to the detection of α-, β-, γ-radiation, X-rays, and neutrons.

A variety of scintillator materials may be employed in the practice of the present teachings. By way of example, and without limitation, the scintillator material may include an organic or inorganic scintillator material. In some embodiments, the scintillator material can include an organic-inorganic hybrid scintillator material. By way of example, such a hybrid organic-inorganic scintillator material can be any of 0D, 1D, 2D, or 3D perovskite material. In some embodiments, the perovskite material can include PEALPB. In some embodiments, an inorganic scintillator material includes at least one of $Cs_3Cu_5I_5$, CsI and CLLB.

In some embodiments, the scintillator material can include an oxide scintillator. In some such embodiments, the oxide scintillator material includes any of BGO and $Gd_2O_2S$. In some embodiments, the scintillator material includes a halide scintillator material. In some such embodiments, the halide scintillator material includes any of an inorganic, an organic and a hybrid halide scintillator material. In yet other embodiments, the scintillator material can be a plastic scintillator (such as flour-doped PVT). In other embodiments, the scintillator material can be a ceramic scintillator, such as, LuAG:Ce or YAP:Ce. In other embodiments, the scintillator material can be a glass scintillator, such a Li-glass or an organic glass scintillator.

In this embodiment, the scintillator material in the lumen of each of the microcapillary structures has a single crystalline structure. The single crystalline structure of the scintillators accurately preserves the energy deposition information from the radiation interaction, thereby providing the desired high energy resolution. In addition, the single crystal scintillators have lower light scattering and provide very high light yield and fast timing response as required by a variety of applications. As an example, the single crystalline PEALPB exhibits a decay time of 11-24 ns and can be used for applications where timing is important such as Time of Flight positron Emission Tomography imaging.

Further, in some embodiments, the microcapillary structures include single crystalline scintillator material such that the crystalline axes of the scintillator materials associated with different microcapillary structures are substantially parallel.

In some embodiments, each of the microcapillary structures has a maximum transverse dimension (i.e., a maximum size in a cross-sectional plane perpendicular to the longitudinal axis (LA) of the microcapillary structure) that is equal to or less than about 3 mm, e.g., in a range of about 20 microns to about 200 microns. With reference to FIG. 1C, by way of example, in this embodiment in which the microcapillary structures have a hexagonal cross-sectional profile, the maximum transverse size is depicted by reference numeral MTS. In some embodiments, the transverse cross-sectional area of each of the microcapillary channels can be substantially uniform along the length of the microcapillary channel, while in other embodiments, the transverse cross-sectional area may vary along the length of the microcapillary channel.

Figure 1D:
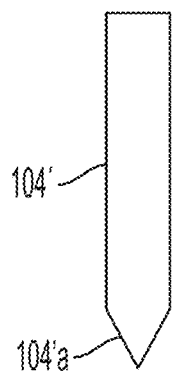

By way of example, with reference to FIG. 1D, a microcapillary channel 104' can have a narrowed distal or proximal section, which is in the form of a closed pointed conical end 104'a. As discussed in more detail below, such a closed pointed conical end can help with crystallization of precursor materials in the process of forming the radiation detecting elements, e.g., facilitating the nucleation process.

Further, in some embodiments, each microcapillary structure can have a length in a range of about 20 microns to about 5 centimeters (cm), e.g., in a range of about 100 microns to about 4 cm, or in a range of about 200 microns to about 3 cm, or in a range of about 300 microns to about 2 cm, or any other sub-range between about 20 microns to about 5 cm. In embodiments, such as the present embodiment in which the microcapillaries are fully filled with the scintillator material, the length of a microcapillary structure corresponds to the thickness of the scintillator material. Thus, in some embodiments, the thickness of the scintillator material of each microcapillary structure can also be in the above ranges.

Figure 3:
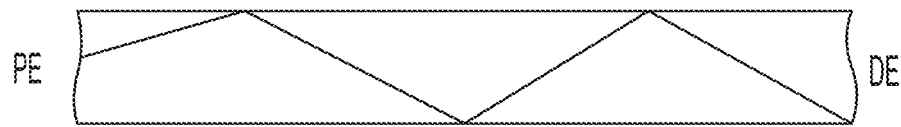

As shown schematically in FIG. 3, in use, radiation incident on the radiation detector 100 can enter one or more of the radiation sensing modules (herein also referred to as radiation sensing elements) via their respective peripheral walls and/or any of their proximal and distal apertures to interact with the scintillator material of the microcapillary structure(s) associated with those sensing modules. In response to the detection of the incident radiation, the scintillator material generates light that can propagate along the length of the microcapillary structure to exit the microcapillary structure via the distal end thereof (alternatively, in some embodiments, the generated light may be collected via the proximal end of the microcapillary structure). The propagation of the scintillation light along the microcapillary structure is facilitated via its reflections at the internal surfaces of the facets of the peripheral wall of the microcapillary structure. Further, in some embodiments, the microcapillary structures can include a coating deposited on inner surfaces thereof, which can also facilitate reflection of the scintillation radiation. Some examples of such reflective coating materials can include thin metal layers, oxide layers, Teflon, or any other suitable reflecting material.

By way of example, as shown schematically in FIG. 3, the scintillation light generated by the scintillator material can undergo multiple total internal reflections at the inner surfaces of these facets to be guided to the distal end (and/or the proximal end) of the microcapillary structure through which the scintillation light can exit the respective microcapillary structure. In some embodiments, the reflection of the light at the internal surfaces of the facets of the wall of a microcapillary can inhibit the passage of the generated light from one microcapillary to an adjacent microcapillary resulting in an enhancement of the spatial resolution of the radiation detector. By way of example, in some embodiments, the leakage of the light between adjacent microcapillary structures, which is herein also referred to as pixel-to-pixel leakage as in some embodiments the light generated in each microcapillary structure contributes to the generation of a pixel of an image formed by an optical imager that is optically coupled to the radiation detector, can be less than about 5%, or less than about 2%, or less than about 1%, or preferably non-existent.

Figure 4A:
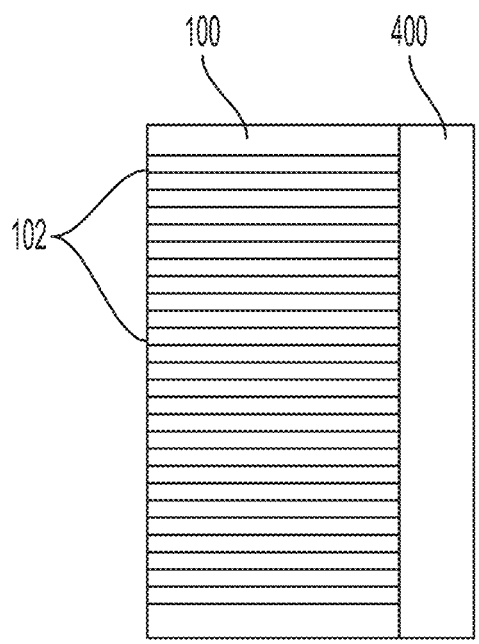
FIG. 4A is a schematic view of a radiation detector system according to an embodiment of the present teachings in which the sensing modules are optically coupled to an optical imager, which is configured to detect the light generated by the scintillator material in response to detection of incoming radiation.

With reference to FIG. 4A, in some embodiments, the scintillation light generated by the scintillator materials disposed in the lumens of the microcapillary structures can be detected by an optical imager that is optically coupled to the distal (or proximal) ends of the microcapillary structures, where the distal (or proximal) ends provide exit apertures through which the light can exit the microcapillary structures. By way of example, in this embodiment, an optical imager 400 is in the form of a CCD (charge coupled device) array that includes a two-dimensional array of optical image sensor elements where each of the optical image sensor elements is optically coupled to the distal end of one of the microcapillary structures to receive the light exiting that microcapillary structure. In other words, in this embodiment there is a one-to-one relationship between the microcapillary structures and the optical image sensor elements. Each of the optical image sensor elements can generate one or more electrical signals in response to the detection of the light incident thereon such that the combination of the electrical signals generated by the image sensor elements provides image data for constructing a two-dimensional image of the radiation incident on the radiation detector. In other words, each pixel of the image corresponds to the scintillator radiation generated by the scintillator material associated with one of the microcapillary structures.

Figure 4B:
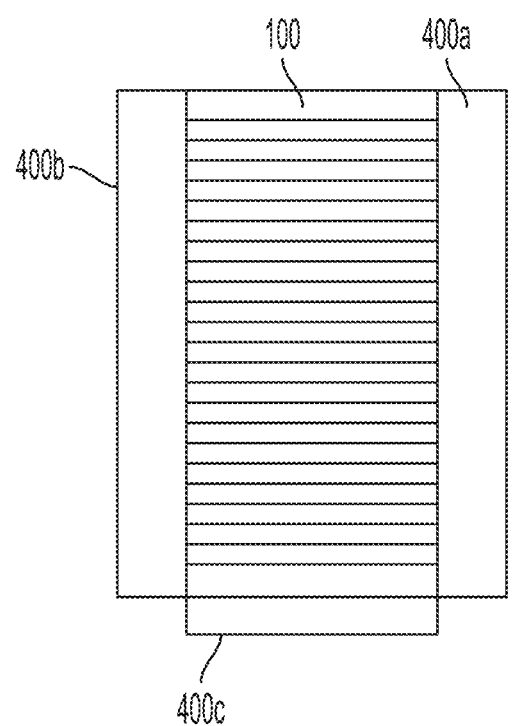
FIG. 4B is a schematic view of a radiation detector system according to an embodiment of the present teachings in which multiple optical images are optically coupled to multiple facets of a radiation detector according to the present teachings for detecting scintillation radiation generated by the scintillator material of the radiation detector.

In other embodiments, multiple optical imagers can be optically coupled to multiple facets of a radiation detector according to the present teachings to capture and detect scintillation radiation exiting those facets. By way of illustration, FIG. 4B shows a radiation detector system having a radiation detector 100 and three optical imagers 400a/400b/400c, which are optically coupled to three facets of the radiation detector to receive and detect scintillation radiation exiting those facets. In some embodiments, based on radiation detection signals from the multiple facets, the position of interaction of the radiation can be determined, which can then be used in enhancing (augmenting) the information obtained from the detector. As an example, determination of the depth of interaction of the incident radiation within the radiation-detecting material can improve timing jitter in positron emission tomography applications, thus resulting in images exhibiting better signal-to-noise (S/N) ratios.

In this embodiment, the scintillator material of each microcapillary structure is substantially optically isolated from the scintillator material disposed in an adjacent microcapillary structure. For example, in embodiments, the index of refraction of the material forming the peripheral walls of the microcapillary structures at the frequency corresponding to the scintillation radiation is sufficiently lower than the respective index of refraction of the scintillator material such that the light rays generated in the scintillator material (or at least the majority of those light rays) undergo multiple total internal reflections as they are incident on the interface between the scintillator material and the peripheral wall of a microcapillary structure.

Figure 5A:
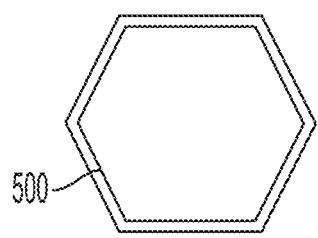
FIG. 5A is a schematic axial view of a sensing module, further illustrating an electrical conductive coating, e.g., a metal coating, formed on an inner surface of the sensing module.

As shown schematically in FIG. 5A, in some other embodiments the inner surface of the microcapillaries (or at least a portion thereof) is coated with a reflective layer, e.g., a thin metallic layer, an oxide layer, or a Teflon layer 500, e.g., a gold layer with a thickness in a range of about 10 nm to about 100 nm, so as to reflect the light generated by the scintillator material so as to trap the light rays (or at least a majority thereof) within the microcapillary structure and inhibit their leakage into adjacent microcapillary structure(s). In yet other embodiments, the microcapillaries may be formed of a metal (e.g., Pb or W), which can reflect the light generated by the scintillator material.

Figure 5B:
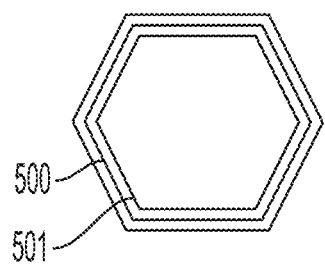
FIG. 5B is a schematic axial view of a sensing module, further illustrating an inner insulating layer and an outer conductive layer coating an inner surface of the sensing module.

In some embodiments, instead of or in addition to the reflective layer, an inner coating surface layer can be deposited on an inner surface of the microcapillary channels to enhance the radiation detection performance of the detector. For example, as shown schematically in FIG. 5B, in addition to the reflective layer 500, such a layer 501 can be a $^6$LiF (lithium fluoride enriched with lithium-6) layer coating an inner surface (or at least a portion of an inner surface) of the microcapillary channels to enable high efficiency thermal neutron detection. In other embodiments, the coating layer 501 can be formed on an inner wall of the microcapillary structures without the reflective layer 500. Such a coating can work synergistically with the scintillator material within the lumens of the microcapillary structures to enhance the detection efficiency of the radiation detector.

Further, in some embodiments, the inner walls of the microcapillaries can be coated with a wavelength-shifting material to convert a lower wavelength scintillation light generated by the scintillator material within the microcapillary to a higher wavelength light, resulting in a more efficient detection of the light using CMOS or CCD backplane or state-of-the art photodetectors such as silicon photomultipliers.

Figure 5C:
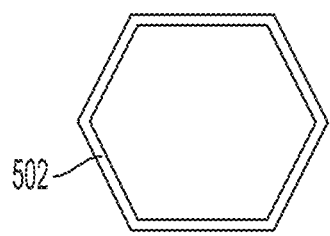
FIG. 5C is a schematic axial view of a sensing module, further illustrating a wavelength-shifting material formed on an inner surface of the sensing module.

For example, as shown schematically in FIG. 5C, such a coating 502 can absorb the scintillation radiation generated by a scintillator material within a microcapillary structure and emit radiation at a longer wavelength, e.g., a longer wavelength that can be more efficiently detected by an optical imager that is optically coupled to the radiation detector. For example, in one embodiment, the scintillation radiation may have a wavelength of about 300 nm and the longer-wavelength radiation that is emitted by the coating material may have a wavelength of about 400 nm.

By way of example, such a wavelength-shifting coating (herein also referred to as wavelength shifter (WLS)) can be formed on the inner walls of the microcapillaries using vapor deposition of WLS materials, such as 1,1,4,4 Tetraphenyl Butadiene (TPB). By way of another example, the wavelength-shifting coating can be formed via solution deposition of WLS, such as CsPbBr3 quantum dots, on the inner walls of the microcapillaries.

The trapping of the light rays within the microcapillary structures can inhibit, and preferably prevent, their leakage into adjacent microcapillary structures and hence advantageously allow configuring the radiation detector such that the thickness of the scintillator material can be made sufficiently large to enhance the detection of the incident radiation entering a microcapillary structured detector architecture, thereby increasing the detector's efficiency, while ensuring that the radiation detector would exhibit a high spatial resolution. In other words, in absence of such microcapillary structures, increasing the thickness of a scintillator material of a radiation detector can lead to a degradation of the radiation detector's spatial resolution due to isotropic propagation of the light generated by the scintillator material. In contrast, in a microcapillary structured radiation detector according to the present teachings, the light generated by the scintillator material within a microcapillary structure is substantially trapped within that microcapillary structure. As a result, thicker scintillator materials may be employed in a radiation detector according to various embodiments while ensuring that the radiation detector exhibits a high spatial resolution.

In some embodiments, the spatial resolution of the radiation detector can be characterized by its modulation transfer function (MTF). As known in the art, an MTF provides a quantitative measure of the spatial frequency response of an imaging system. In some embodiments, a radiation detector according to the present teachings can exhibit an MTF of at least about 5%, e.g., in a range of about 5% to about 100%, for spatial frequencies in a range of zero to about 8 lp/mm (line pairs per millimeter) for detection of any of X-ray, γ-ray radiation, or neutrons.

Figure 6A:
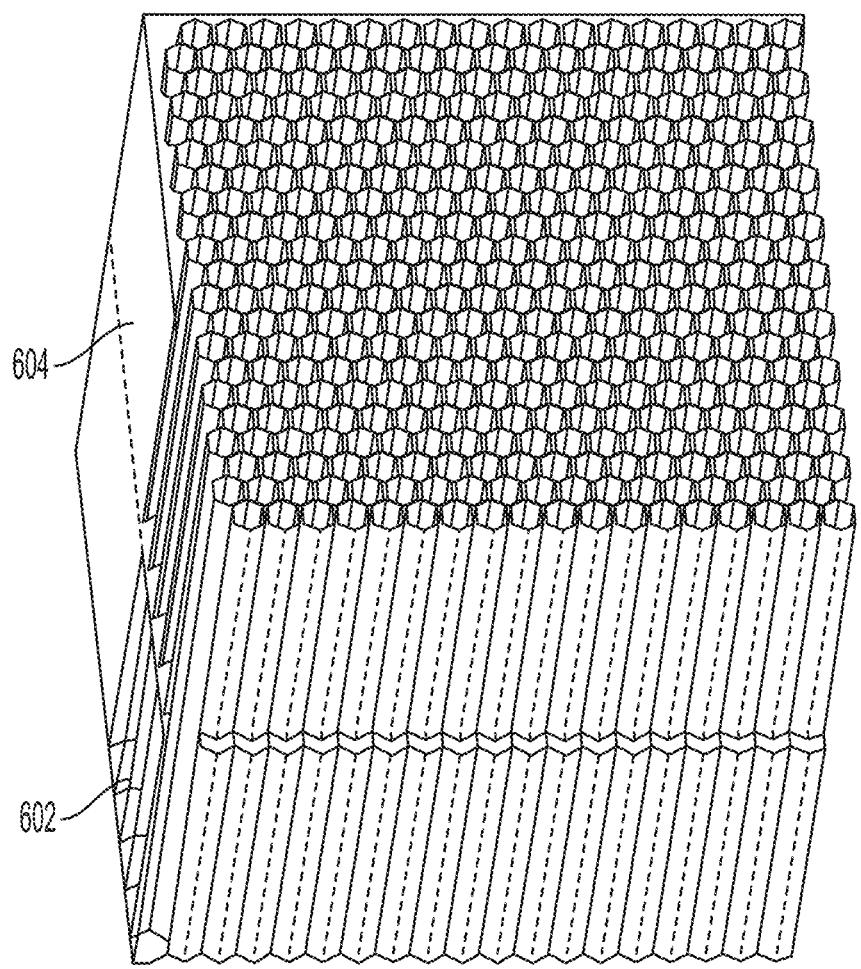
FIG. 6A is a schematic view of a radiation detector according to an embodiment of the present teachings, which includes a plurality of stacked layers of capillary structures.

With reference to FIG. 6A, in some embodiments, a radiation detector 600 according to the present teachings can include multiple layers 602, 604 of microcapillary structures, wherein the layers are stacked relative to one another. In this embodiment, the radiation detector layers 602, 604 are vertically stacked relative to one another while in other embodiments, such radiation detector layers can be stacked in any other desired orientation (e.g., horizontal orientation). In some embodiments, the radiation detector layers are configured to preferentially detect the same radiation modality (e.g., γ-ray radiation). In some such embodiments, the radiation that may pass through one layer without being detected could be detected as it passes through an adjacent layer, thereby increasing the detection efficiency of the radiation detector.

In some embodiments, multiple types of radiation (herein also referred to as radiation modalities) can be detected by the multiple layers. By way of example, one layer of the microcapillary structures can be configured to detect γ radiation while another layer of the microcapillary structures may be configured to detect thermal neutrons. For example, in such an embodiment, the scintillator material that is more suitable for the detection of γ radiation can be, without limitation, any of CsI, NaI, LaBr$_3$, SrI$_2$, CeBr$_3$, or combinations thereof and the scintillator material that is more suitable for the detection of thermal neutrons can be any of $^6$LiF/ZnS, CLLB, CLYC, Li-glass, or combinations thereof.

Further, in some embodiments, one layer of the multilayer microcapillary structures can be configured to provide preferential detection of incident radiation in different energy regimes, e.g., similar to Phoswich scintillator configurations. For example, in some such embodiments, all of the layers of the microcapillary structures can be configured for the detection of the γ radiation, but with different layers being configured for preferential detection of the γ radiation in different energy ranges. Such embodiments can be implemented by utilizing different scintillator materials and/or combinations thereof.

By way of example, in one implementation such a radiation detector can include two stacked layers of microcapillary structures, where one layer (e.g., the lower layer 602 in FIG. 6A) is configured for the detection of γ radiation in a lower energy regime (e.g., γ rays having an energy in a range of about 1 keV to about 100 keV) and the other layer (e.g., the upper layer 604 in FIG. 6A) is configured for the detection of γ radiation in a higher energy regime (e.g., γ rays having an energy in a range of about 1 MeV to about 10 MeV). It should be understood that in some embodiments, the number of layers of the microcapillary structures can be more than two, e.g., the number of layers can be in a range of 2 to about 20, or more.

Further, in some embodiments, a plurality of layers can be configured to preferentially detect one type of incident radiation in different energy regimes and a plurality of other layers can be configured to preferentially detect another type of incident radiation in different energy regimes. By way of example, two tandem stacked layers can be configured to detect γ rays with one layer being configured for preferential detection of the γ rays in a low energy regime (e.g., energies in a range of about 1 keV to about 100 keV) and the other layer being configured for preferential detection of the γ rays in a higher energy regime (e.g., energies in a range of about 1 MeV to about 10 MeV). Two other tandem stacked layers can in turn be configured to detect thermal neutrons, with one layer preferentially detecting thermal neutrons in one energy regime (e.g., in an energy regime of about 26 meV)) and another layer preferentially detecting fast neutrons in another energy regime (e.g., in an energy regime in a range of about 1 to about 10 MeV).

In some embodiments, a radiation detector can include a single layer of microcapillary channels in which the scintillator material in some of the microcapillary channels can be different than the scintillator material in some of the other microcapillary channels to allow, e.g., the detection of two or more different radiation modalities and/or to provide different types of radiation detection information.

Figure 6B:
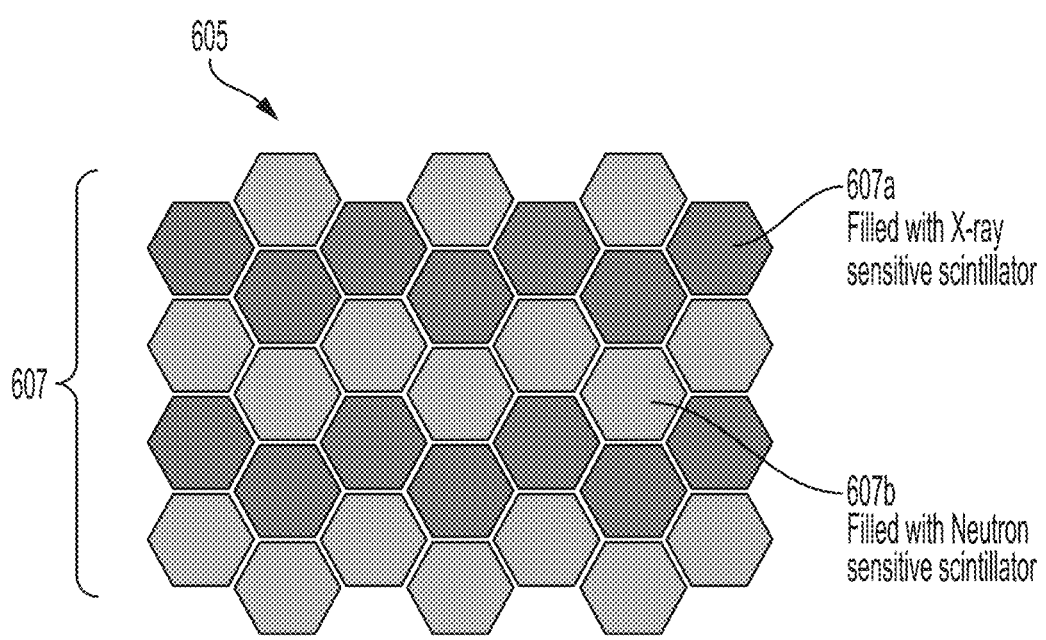
FIG. 6B is a schematic view of a radiation detector according to an embodiment of the present teachings, which includes two subsets of microcapillary structures filled with different scintillator materials.

By way of example, FIG. 6B schematically shows an example of such a radiation detector 605 having a plurality of microcapillaries 607, each of which has a hexagonal cross-sectional shape. A subset 607a of these microcapillaries are filled with a scintillator material (e.g., scintillating plastic) that is suitable for the detection of X-rays and another subset 607b of the microcapillaries are filled with a scintillator material (e.g., organic glass scintillator) that is suitable for the detection of neutrons. While in this embodiment each subset constitutes 50% of the total number of the microcapillaries, in other embodiments, the number of microcapillaries in one subset may be more than the number of microcapillaries in another subset. Further, more than two subsets of microcapillaries may be employed. For example, the number of subsets can range from 2 to about 20.

In some embodiments, one subset of the microcapillaries can be configured to provide information regarding the energy of the detected radiation while another subset of the microcapillaries can be configured to provide information regarding the timing of the detection of the incident radiation. By way of example, in some implementations, a subset of the microcapillaries can be filled with a high-Z scintillator material (such as CsI) to provide gamma energy information while another subset of the microcapillaries can be filled with a low-Z, but ultrafast scintillator material, to provide timing information.

The microcapillaries of the two subsets can be juxtaposed relative to one another in a variety of different ways, e.g., depending on a particular application. For example, in this embodiment, the microcapillaries of the two subsets are positioned as alternating rows relative to one another.

Figure 6C:
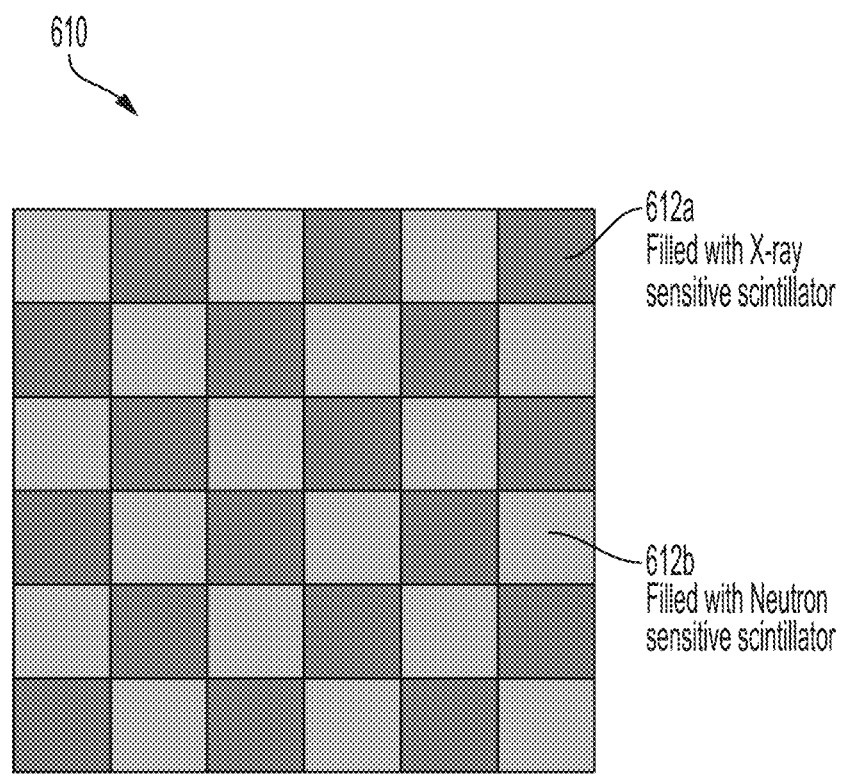
FIG. 6C is a schematic view of a radiation detector according to an embodiment of the present teachings, which includes two subsets of microcapillary structures filled with different scintillator materials, where the microcapillary structures of the two subsets are arranged in checkerboard pattern relative to one another.

FIG. 6C shows another example of a radiation detector 610 according to the present teachings, which similar to the previous embodiment, includes two subsets 612a and 612b of microcapillaries, where the microcapillaries in the subset 612a are filled with a scintillator material that is suitable for the detection of X-rays and the microcapillaries in the subset 612b are filled with a scintillator material that is suitable for the detection of thermal neutrons. In this example, the microcapillaries of the two subsets are arranged in an alternating fashion relative to one another such that they form a checkerboard pattern.

Similar to the previous embodiments, an optical imager (e.g., CMOS or CCD backplanes or state-of-the-art photodetectors such as silicon photomultipliers), not shown in this figure, can be optically coupled to the microcapillary structures of the last layer to detect the light generated by the scintillator materials disposed in the microcapillary structures.

Semiconductor Radiation Detectors

Figure 7A:
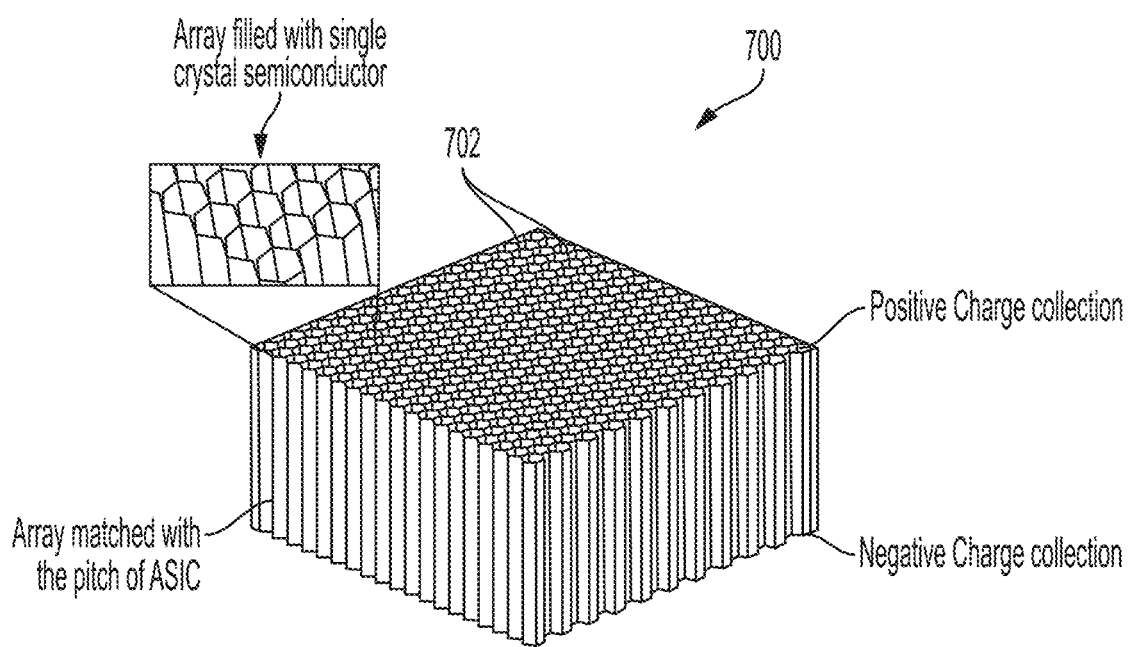
FIG. 7A is a schematic view of a radiation detector according to an embodiment, which includes a plurality of microcapillary structures filled with a semiconductor material.

In other embodiments, radiation detectors are disclosed, which include a plurality of microcapillary structures, such as those discussed above, having inner lumens that are partially, or fully, filled with a semiconductor material for detecting incident radiation. For example, with reference to FIGS. 7A and 7B, similar to the previous embodiment, such a radiation detector 700 includes a plurality of independent radiation sensing modules 702 (herein also referred to as radiation sensing elements or radiation detecting modules or radiation detecting elements, or simply sensing elements or detecting elements). Similar to the previous embodiment, the plurality of sensing modules 702 are arranged relative to one another to collectively allow the detection of incident radiation.

Similar to the previous embodiment, each radiation sensing module 702 includes a microcapillary structure 704 that extends from a proximal end (PE) to a distal end (DE) along a longitudinal axis (LA), where the proximal and distal ends include apertures 704a/704b through which, in some embodiments, the electric charges generated in the semiconductor in response to the detection of incident radiation can be collected.

Again, similar to the previous embodiment, each microcapillary structure 704 includes a peripheral wall 706 that surrounds an inner lumen 708, where the inner lumen is filled with a semiconducting material 710. In this embodiment the semiconducting material fills the entire volume of the lumen of each of the microcapillary structures from its proximal end to its distal end. In other embodiments the semiconducting material may partially fill the inner lumen of one or more of the microcapillary structures. In this embodiment, the peripheral wall 706 of the microcapillary structure includes six facets that are positioned at an angle relative to one another such that the microcapillary structure exhibits a hexagonal cross-sectional shape in a plane perpendicular to its longitudinal axis.

In this embodiment, each of the radiation sensing elements includes a pair of electrically conductive electrodes for collecting electric charges generated in the semiconducting material (i.e., electron-hole pairs) in response to the detection of incident radiation. As shown schematically in FIG. 7D, in this embodiment the conducting electrodes are implemented as a pair of metallic coatings disposed on an inner surface of each of the microcapillary structures with insulating gaps 711a/711b separating the electrodes (e.g., the insulating gaps may be formed by the material of the peripheral wall of the microcapillary structure, such as glass, quartz, PTFE).

Figure 7B:
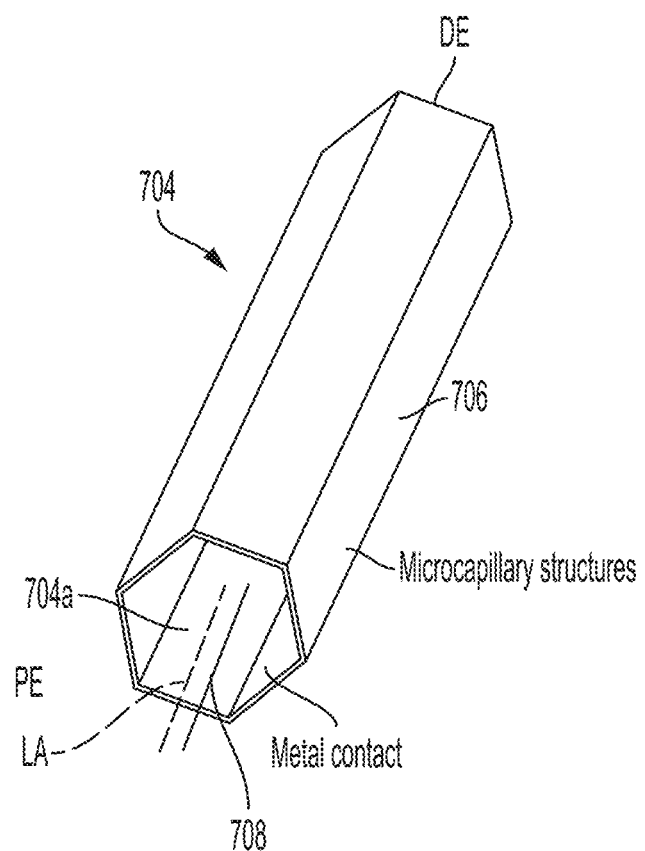
FIG. 7B is a schematic perspective view of a sensing module employed in the radiation detector of FIG. 7A.
Figure 7C:
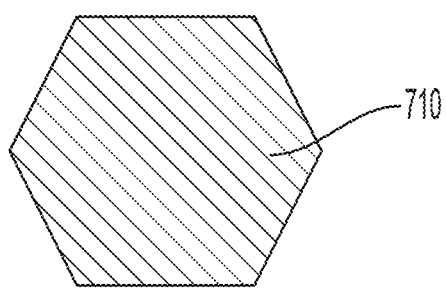
FIG. 7C is an end axial view of a sensing module utilized in the radiation detector of FIG. 7A, schematically illustrating a semiconductor material disposed in the microcapillary structure of the sensing module, FIG. 7D schematically depicts a pair of conductive electrodes disposed in a sensing module utilized in the radiation detector of FIG. 7A for collecting electric charges generated in the semiconductor material in response to detection of incident radiation, FIG. 7E schematically depicts a radiation detector having two subsets of radiation detecting elements, where the radiation detecting material in one subset differs from the radiation detecting material in the other subset, FIGS. 8A and 8B schematically illustrate, respectively, a perspective and a cross-sectional view of a radiation detecting element in which an $SiO_2$ layer is coated on an inner surface of the microcapillary channel associated with the radiation detecting element, FIGS. 8C and 8D schematically illustrate a perspective view and a cross-sectional view of a radiation detecting element in which an inner insulating layer and an outer conductive layer are deposited on an inner surface of a microcapillary structure associated with that radiation detecting element.
Figure 7D:
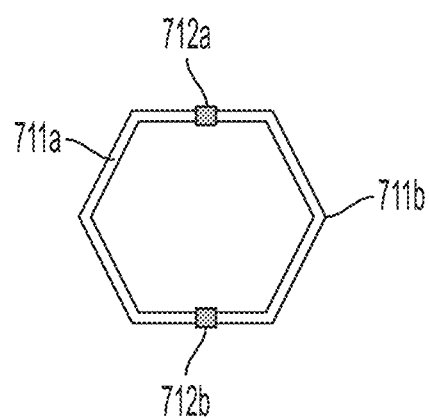

The incident radiation can enter each of the microcapillary structures, such as the microcapillary structure 704 depicted in FIG. 7B, via any of its peripheral walls and/or its proximal and distal apertures to interact with the semiconducting material in that microcapillary structure. The detection of the incident radiation by the semiconducting material (e.g., the semiconducting material 710 shown schematically in FIG. 7C) within the microcapillary structure can result in the generation of electric charges (electron-hole pairs) within the semiconducting material. Without being limited to any particular theory, the radiation incident on the semiconducting material within a microcapillary structure can generate electron-hole pairs via excitation of electrons from a valence band of the semiconducting material to its conduction band.

The electron-hole pairs can be collected by the opposed electrodes (cathode and anode) incorporated in the microcapillary structure to generate one or more electrical signals indicative of the detection of the incident radiation. The electrical signals generated by the radiation detecting elements can be processed by electrical circuitry, e.g., an ASIC (application specific integrated circuit), in a manner known in the art as informed by the present teachings to generate an image of the incident radiation.

Figure 7E:
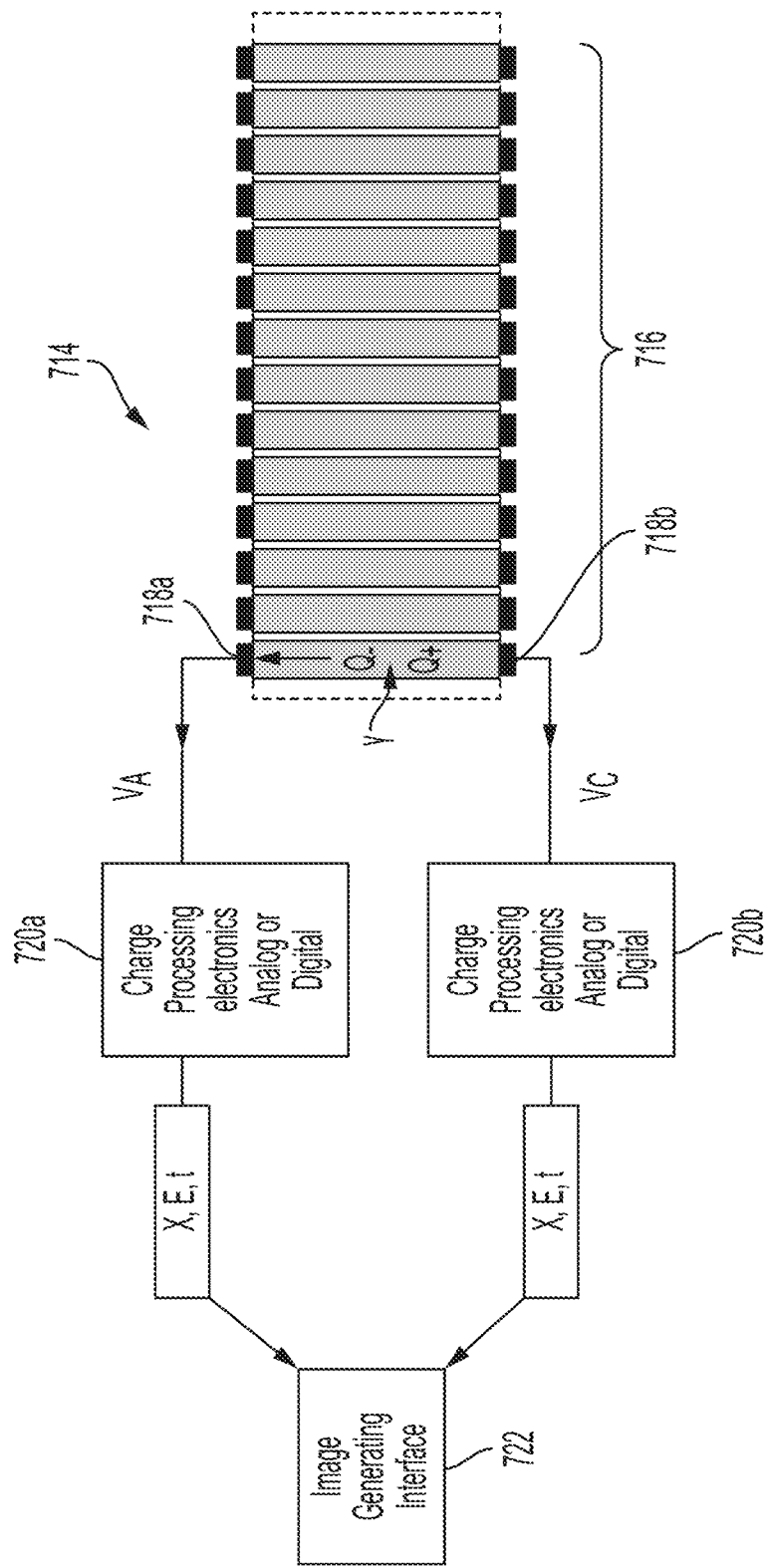

In some embodiments, the pair of conductive electrodes for collecting electric charges generated in each of the radiation detecting elements can be coupled to the proximal and distal ends of the radiation detecting elements. FIG. 7E schematically depicts an example of such a radiation detector 714 that includes a plurality of radiation detecting elements 716, each of which is formed by filling a microcapillary with a semiconductor material in a manner described herein.

A pair of electrically conductive electrodes 718a/718b (anode and cathode) are coupled to the proximal and distal ends of each radiation detecting element to collect electrical charges (electro-hole pairs) generated within the radiation-detecting material. The charges collected at each of the electrodes 718a/718b can generate electrical signals that are received, respectively, by charge processing electronics analog or digital circuitries 720a/720b that can analyze the signals in a manner known in the art to determine, for each of the radiation detector elements giving rise to the anode/cathode signals, the energy of the incident radiation and the timing of the signal.

Such data generated by the charge processing electronics analog or digital circuitry 720 is received by an imaging interface 722 that is configured to utilize that data to generate an image of the incident radiation. The charge processing electronics analog or digital circuitry 720 and the imaging interface 722 can be implemented using known techniques in the art as informed by the present teachings.

In some embodiments, using the cathode and the anode signals generated in response to the detection of incident radiation (e.g., γ radiation), the position of radiation interaction within the depth of the semiconductor can be estimated. For example, the difference between the timing of the electrical signals generated at the anode and the cathode electrodes in response to the detection of incident radiation can be employed to determine the location of charge generation within the semiconductor. Computational techniques known in the art, as informed by the present teachings, can be employed to operate on the timing of the electrical signals generated at the anode and the cathode electrodes to infer the location of the charge generation within the semiconductor material. By way of illustration, an example of such computational techniques is provided in an article titled "Improved resolution for 3-D position sensitive CdZnTe spectrometers," published in IEEE Transactions on Nuclear Science, Volume 51, Issue 5, Part 1, October 2004, which is herein incorporated by reference in its entirety.

Based on this estimation of the position of the interaction of the incident radiation within the depth of the semiconductor, a correction factor can be calculated and applied to the energy spectra obtained from the electrical signals generated in response to the detection of the incident radiation in the semiconductor, resulting in better identification of the incoming radiation, as required by many applications such as radioisotope identifier equipment used for homeland security applications.

In some embodiments, a radiation detector according to the present teachings is capable of providing a high spatial resolution as determined by the microcapillary pitch and high energy resolution as provided by the depth correction simultaneously.

A variety of semiconducting materials can be employed in the practice of the present teachings. Some examples of suitable semiconducting materials include, without limitation, elemental semiconductors, such as silicon, compound semiconductors, such as Cadmium Zinc Telluride, Thallium Bromide, Mercuric Iodide, Cesium Lead Bromide, Gallium Arsenide, organic as well as organic-inorganic hybrid semiconductors, such as Methylammonium Lead Iodide, and Methylammonium Lead Bromide.

The walls of the microcapillary structures can be formed of a variety of materials, such as those listed above in connection with the previous embodiment, including, without limitation, glass, quartz, metals (e.g., Pb, W), plastic materials (e.g., PTFE).

In some embodiments, the semiconducting materials in the inner lumens of the microcapillary structures can have a single- or a poly-crystalline composition. In other embodiments, the semiconducting materials in the inner lumens of the microcapillary structures can be in the form of an amorphous semiconductor material.

In some embodiments, the inner surface of each of the microcapillary structures that is at least partially filled with a semiconducting material is coated, partially or fully, or can be formed of a high resistivity material, e.g., a material exhibiting a resistivity of about $10^{16}$ Ωm, such as $SiO_2$ so as to reduce the total dark current exhibited by the radiation-detecting element, thereby reducing the noise in the data provided by the detector for constructing an image of the incident radiation.

Figure 8A:
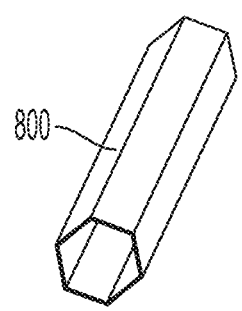
Figure 8B:
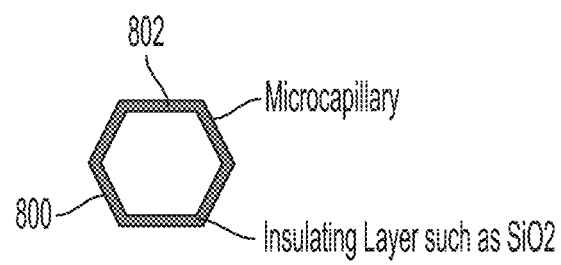

By way of example, FIGS. 8A and 8B schematically depict a microcapillary structure 800 in which an $SiO_2$ layer 802 coats an inner surface of the peripheral wall of the microcapillary structure. By way of example, the thickness of the $SiO_2$ coating layer can be in a range of about 50 nm to about 100 nm. In some embodiments, the $SiO_2$ layer can function as a passivating layer for reducing the dangling bonds at the surface of the semiconductor material, thereby reducing the dark current associated with the semiconductor material. Although in this embodiment $SiO_2$ is employed as the insulating layer, in other embodiments other suitable insulating materials may be employed.

Figure 8C:
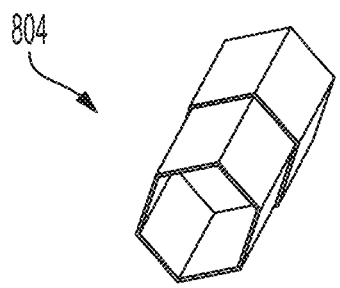
Figure 8D:
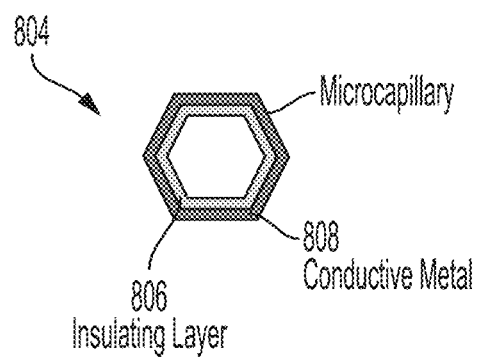

In some embodiments, a microcapillary structure can have both an inner electrically insulating layer and an outer electrically conductive layer coating at least a portion of the inner surface of its peripheral wall. By way of example, FIGS. 8C and 8D schematically depict such a microcapillary structure 804 in which an inner electrically insulating layer 806 and an outer electrically conductive layer 808 coat the inner surface of the peripheral wall of the microcapillary structure. By way of example, the electrically insulating layer 806 can be an $SiO_2$ layer and the electrically conductive layer can be a gold layer. The conductive layer can be held at a certain electric potential with respect to the anode and the cathode (e.g., the anode and the cathode 718a/718b depicted in FIG. 7E) to enhance the collection of the electric charges generated in the semiconductor. Without being limited to any particular theory, the electrical potential difference between the conductive layer and the anode and cathode can generate an electric field pattern within the semiconductor that can help with the collection of the charged particles by the anode and the cathode. By way of example, and without limitation, in some implementations, a 100-nm insulating layer and a 50-nm electrically conducting layer can be employed.

The combination of high thicknesses of the radiation-detecting materials used in radiation detectors according to the present teachings together with a high spatial resolution allows the use of such radiation detectors in a variety of imaging applications. For example, radiation detectors according to the present teachings can be used for neutron radiography, thereby providing detector solutions for X-ray and neutron multimodal radiography. A variety of detector materials can be used in the practice of the teachings.

Methods of Fabrication

With reference to the flow chart of FIG. 9, one method of fabricating a radiation detector according to an embodiment of the present teachings includes dispersing one or more precursor materials including a radiation-detecting material or a precursor thereof into a plurality of microcapillary channels and processing the precursor materials to cause the formation of radiation detecting elements within the microcapillary channels so as to generate a plurality of independent radiation sensing elements each of which is associated with one of the microcapillary channels.

By way example, in some embodiments, the precursor materials can be crystallized to form single or polycrystalline radiation detecting elements. By way of example, solution-based techniques may be employed for causing the crystallization of the precursor material(s). For example, the crystallization of the precursor materials can be achieved via using solvent evaporation techniques, which can include directional evaporation of the solvent facilitated by changing the temperature or the pressure of the fabrication atmosphere (e.g., via application of a vacuum).

In some embodiments, the crystallization of the precursor materials can be achieved using antisolvent-assisted crystallization where, for example, the antisolvent is introduced to the fabrication atmosphere at a certain rate and volume, thereby initiating and continuing crystallization of the sensor elements inside the microcapillaries.

In some embodiments, the crystallization of the precursor materials can be achieved via inverse temperature crystallization. For example, by increasing the temperature of the fabrication atmosphere at a controlled rate, the solubility of the crystal in its supersaturated solution is decreased, resulting in seed crystallization inside the microcapillaries. With time and further changes in the temperature, the seed crystals grow and fill up the microcapillaries.

In some embodiments, the crystallization of the precursor materials can include the use of polymerization techniques. Some examples of such polymerization techniques include, without limitation, condensation polymerization and addition polymerization. The polymerization process may also include temperature and pressure-related fabrication steps.

In some embodiments, the crystallization of the precursor materials can be achieved using melt-based techniques.

In some embodiments, the crystallization of the precursor materials can be achieved using directional gradient temperature freezing. In this technique, a directional temperature gradient is applied to a substrate or a fabrication atmosphere to nucleate and grow the crystalline sensor materials inside the microcapillaries. For proper nucleation, geometrically modified microcapillary structures can be used. As an example, the microcapillaries can have a closed pointed conical end (See, e.g., FIG. 1D) to initiate the crystal nucleation. These nuclei will grow based on the directional temperature gradient imposed externally. Depending on the application, the pointed part of the microcapillary can be removed before using the resulting microcapillary structures as radiation detecting elements.

In some embodiments, the crystallization of the precursor materials can be achieved using heat exchanger method growth. In such a method, the temperature of the substrate is actively varied over time to initiate and propagate single crystalline, or polycrystalline growth of the sensor elements inside the microcapillaries. Such a technique can also be utilized to cause the precursor materials to form an amorphous composition functioning as the sensor elements.

In some embodiments, the crystallization of the precursor materials can be achieved using a gas-assisted crystal growth technique. In this process, a gas stream of a certain composition is flowed in the vicinity of the substrate, thereby inducing seed nucleation and facilitating crystal growth inside the microcapillaries.

In some embodiments, the crystallization of the precursor materials can be achieved using thermal quenching. In such a technique, the temperature of the substrate or the atmosphere around it is changed quickly (known as quenching in the art), thereby including crystal nucleation and growth.

In some embodiments, physical vapor deposition techniques can be utilized to fill the microcapillaries with the precursor materials. In some embodiments, the microcapillaries can be filled with the precursor materials using thermal evaporation. In such a technique, the precursor materials can be vaporized at a high temperature and deposited on the microcapillary walls so as to slowly fill up the microcapillaries.

In some embodiments, sputtering techniques can be utilized for filling the microcapillaries with precursor materials. In such techniques, the precursor materials are sputtered and deposited on the microcapillary walls so as to slowly fill up the microcapillaries.

In some embodiments, atomic layer deposition techniques can be utilized for filling the microcapillaries with the precursor materials. In such techniques, the precursor materials can be atomically deposited on the walls of the microcapillaries so as to slowly fill up with the microcapillaries.

In some embodiments, chemical vapor deposition techniques can be employed to fill the microcapillaries with the precursor materials.

The following examples are provided for further elucidation of various aspects of the present teachings and are not intended to necessarily specify the optimal ways of fabricating radiation detectors according to the present teachings or optimal results that may be obtained using such radiation detectors for detecting incident radiation.

Examples

X-ray imaging is the most common and widely used diagnostic technique that spans numerous fields. X-rays interact with the atomic electrons resulting in higher absorption cross-sections for higher atomic number elements depending on the overall electron density distribution of the object. X-ray radiography is currently performed primarily using direct and indirect techniques, which involve the detection of charge carriers and photons generated by the X-rays, respectively.

Indirect flat panel X-ray imagers (FPXIs) with scintillating layers (such as commercially available microcolumnar CsI and $Gd_2O_2S$) have high detective quantum efficiency (DQE) and are the preferred detectors for all hard X-ray imaging applications. However, to limit the spreading of the scintillation light, the thicknesses of these sensors are limited to about ~500 μm. These sensors provide decent spatial resolutions with modulation transfer function (MTF) values around 30% at 2 lp/mm, but the lower thickness limits the detector sensitivity, resulting in higher X-ray dose requirements. Direct detectors are good candidates for achieving higher spatial resolutions. However, charge trapping and defect-related challenges lower the sensitivity of these detectors significantly. Due to their lower atomic numbers, the most successful large area direct detectors such as amorphous selenium (a-Se) and silicon have low efficiencies for higher X-ray energies.

Spatial resolution is an extremely important factor for X-ray imaging that helps users distinguish between two adjacent features. A detector with high MTF, for example, can reliably detect a micron-scale cancerous lesion or a mm-scale fracture in a gas pipeline with high levels of confidence. While the trend of the imaging industry is shifting towards feature recognition using artificial intelligence, higher spatial resolution in radiography images significantly enhances the detection probabilities of subtle features such as pulmonary nodules using the neural network deep learning models.

In addition to spatial resolution, the indirect detectors must provide high enough contrast, be manufacturable in large areas (>10 cm×10 cm), have a fast decay time, and have a low afterglow.

An exemplary detector was fabricated based on the present teachings as discussed in more detail below. The exemplary fabricated detector can provide an excellent solution for high spatial resolution X-ray radiography. The detector included a solution-processable two-dimensional (2D) hybrid perovskite single-crystal scintillator, lithium-alloyed phenethylammonium lead bromide (PEALPB) incorporated into a glass microcapillary array.

In terms of crystal structure, hybrid (containing organic and inorganic constituents) perovskite scintillators can be classified as three-dimensional (3D) and two-dimensional (2D). Although the 3D perovskite scintillators with lower exciton binding energy (tens of meV) have been shown to provide excellent X-ray scintillator response, the 2D perovskite scintillators have the potential for providing higher light yield and faster decay due to their higher exciton binding energy (hundreds of meV). The 3D lead halide perovskites can be transformed into a 2D one by introducing a long alkyl chain or a bulky organic cation. PEALPB belongs to the 2D family, where the alternating inorganic/organic layers effectively confine the exciton inside the inorganic layer generating scintillation in response to X-rays, fast neutrons, and alpha particles that are released as a byproduct of thermal neutron absorption by Li. Li-doping provides a unique benefit for perovskite materials. Even though the solution-processed hybrid perovskites have demonstrated excellent performance in many applications, a high concentration of trap states with a density of $10^{15}$-$10^{16}$ $cm^{-3}$ still exists, resulting in nonradiative recombination.

It has been experimentally verified that this deleterious feature can be significantly reduced when the lattice is doped with high concentrations of Li. It is possible to synthesize 2D scintillators with high concentrations of $^6Li$ due to the small size of the Li-ion relative to the large unit cell of 2D materials. Li-alloying also broadens the radioluminescence emission spectra of PEALPB, with its maximum at 436 nm. Li-doping also substantially increases the light yield of the PEALPB scintillators.

In this example, the light yield of free-standing single-crystal PEALPB sensors was found to be around 18,700±1200 ph/MeV as measured using $^{137}Cs$ gamma source. The fabricated sensor of this example successfully demonstrates the high spatial resolution limits that can be achieved for X-ray imaging using the present teachings. In addition, the presence of $^6Li$ provides a large capture cross-section for the detection of thermal neutrons, while the high concentration of hydrogen (24 hydrogen atoms/molecule) enables the detection of fast neutrons.

Thus, by adjusting the content of $^6Li$ in the matrix, these detectors can also be tuned to detect neutrons over a wide range of energies. The results show the neutron detection capabilities are provided further below. The spatial resolution of the exemplary detectors fabricated in accordance with the present teachings with thicknesses as high as 1200 μm was measured to be better or comparable to the state-of-the-art direct and indirect detectors with much lower thicknesses. The decay time constant of the PEALPB 2D perovskite detector was measured to be about 11-24 ns, and its afterglow was an order of magnitude lower than the modern industry-standard CsI scintillators.

Thus, compared to the CsI scintillator-based detectors, the maximum count rate of detectors based on PEALPB can be expected to be appreciably higher. Although no specific radiation hardness studies have been done for PEALPB, in general, the radiation tolerance of the 2D perovskites has been shown to be very high, which makes them appropriate for high flux X-ray synchrotron beamline and industrial applications.

A high detection efficiency is needed to enable high-energy X-ray imaging. For all known scintillators, this can be achieved by the use of thick films of the order of several millimeters. For example, for 50% attenuation of 150 keV X-rays, CsI detectors require a thickness of 2.1 mm. Such film thicknesses, however, are not conducive to high spatial resolution imaging, as the photons generated in the film propagate isotropically and impinge on a multitude of pixels on the imaging chip resulting in blurred images. To overcome this issue, in this example, microcapillary plates with pore sizes between 20 μm and 100 μm were employed.

Figure 10C:
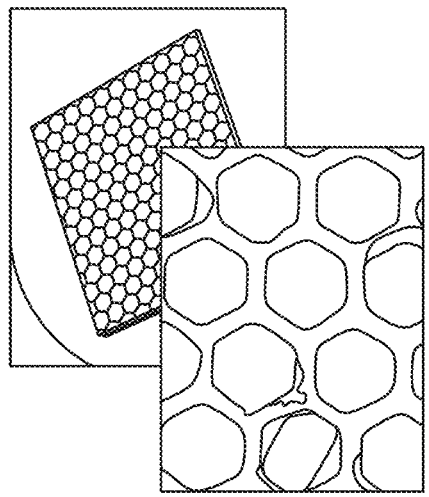
FIG. 10C shows a higher magnification of the 1.2 mm tall PEALPB scintillators in a glass matrix.
Figure 10B:
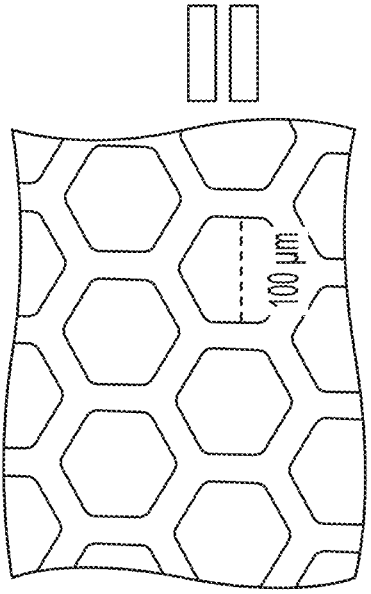
FIG. 10B shows the side view of the model.
Figure 10A:
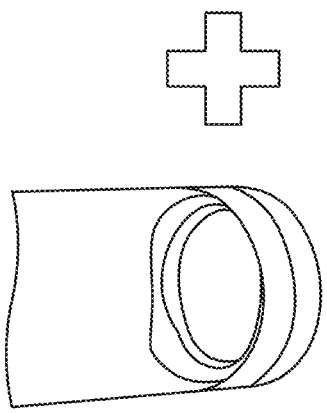
FIG. 10A shows a top view of 2×2 cm faceplate on top of a silicon imager.

Specifically, 100 and 20-micron pore diameter microcapillary plates were filled with single-crystalline PEALPB perovskite scintillator with similar X-ray attenuation coefficients compared to CsI (e.g. 1.9 vs. 1.8 $cm^2/g$ at 100 keV) and an X-ray imager using this sensor was demonstrated. FIGS. 10A and 10B summarize the overall approach for the production of these microcapillary-based detectors. FIG. 10C shows a magnified fluorescence view of the microcapillaries containing the single crystals of PEALPB. The back image in FIG. 10C shows a 2 cm×2 cm×1.2 mm microcapillary plate scintillating under UV irradiation. The arriving X-rays from the source ionize the scintillator material in the microcapillary, producing photons that emanate isotropically. The index of refraction of PEALPB is appreciably higher (~1.9-2.1) than that of the microcapillary walls made from silica (~1.5). The refractive index of the PEALPB scintillators was measured using a refractive index meter. The photons undergo nearly complete internal reflections along the glass capillary before they leave the detector to enter the photon collecting photodetectors.

Figure 12A:
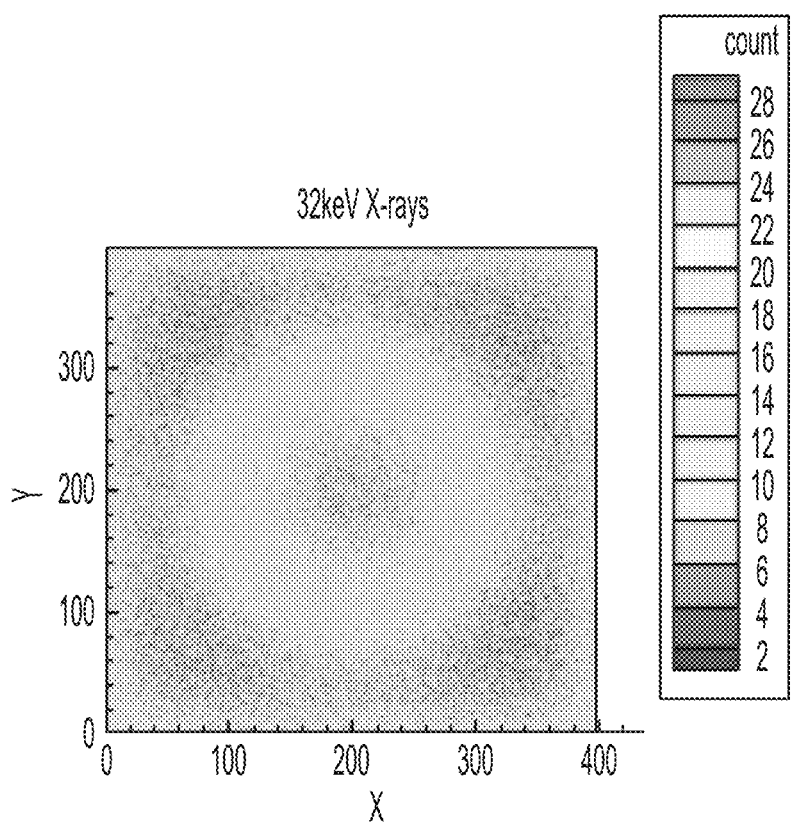
FIGS. 12A-12B show hit counts of optical photons incident on pixels of a silicon imager generated using a circular pattern of incident 100,000 hard X-rays (32 keV) on the array of PEALPB detectors, where
Figure 12B:
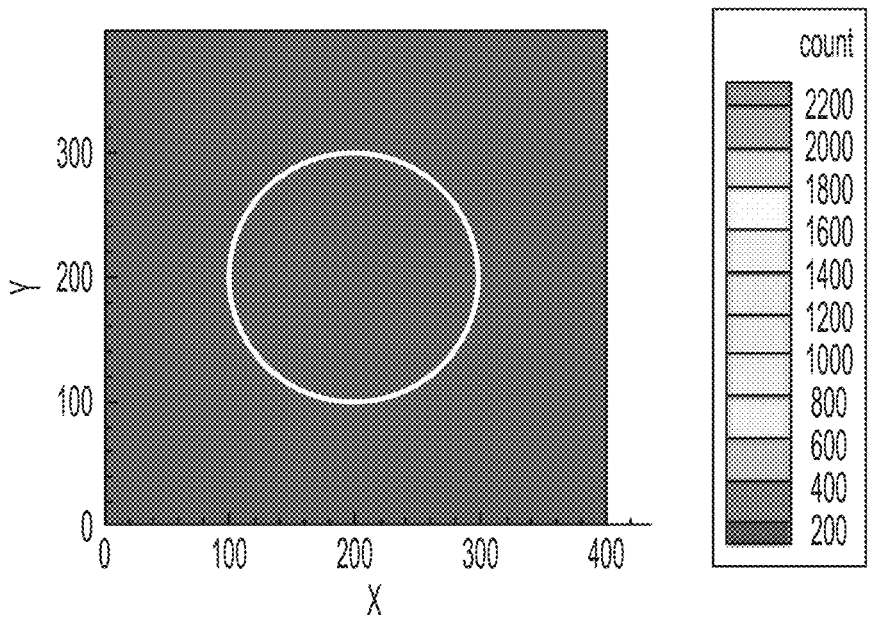

Geant4 simulations were used to assess the effectiveness of microcapillaries to achieve a high spatial resolution. A Geant4 model of a high-density array of 29,000 hexagonal PEALPB detectors was constructed (FIGS. 11A-11C). The faceplate was placed on a silicon imager consisting of 400×400 square pixels of 50 μm on a side. A circular pattern of radiation, either 32 keV hard X-rays (and 25 meV thermal neutrons) was directed at the faceplate from above to assess the ability of the design to provide good imaging resolution. Energy deposited by the radiation in PEALPB generated optical photons that scattered throughout the faceplate. However, as shown in FIGS. 12A and 12B, the difference in refractive index between PEALPB and glass tended to confine the photons to the hexagonal microcapillary, resulting in most photons being collected directly beneath the point of interaction.

These simulations show that radiation detectors according to the present teachings can provide a very high spatial resolution detectors.

In addition to X-rays, $^6$Li-alloyed Phenethylammonium lead bromide (PEALPB) is also responsive to neutrons. The thermal neutrons interact with the $^6$Li in PEALPB, and an alpha and triton are produced from each interaction. These charged particles then ionize the scintillator resulting in the generation of photons which, like those generated by X-rays, undergo near-complete internal reflection and leave the detector. For fast neutrons with energy En primarily undergo elastic scattering with the hydrogen in the PEAPLB and produce recoil protons with energy, $E_p = E_n \cos 2\theta$, $\theta$ being the scattering angle. These protons ionize the scintillator and produce the photons that are then detected by the photodetectors.

Figure 13:
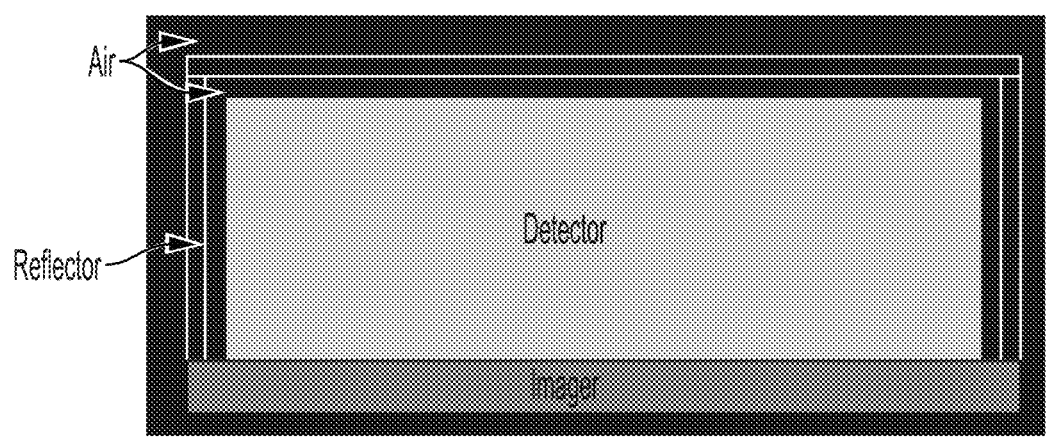

The device architecture shown in FIG. 13 was used for performing GEANT4 simulation results. The fast neutron detection efficiency of the microcapillary detector was evaluated by Geant4 Monte Carlo simulations.

Figure 14:
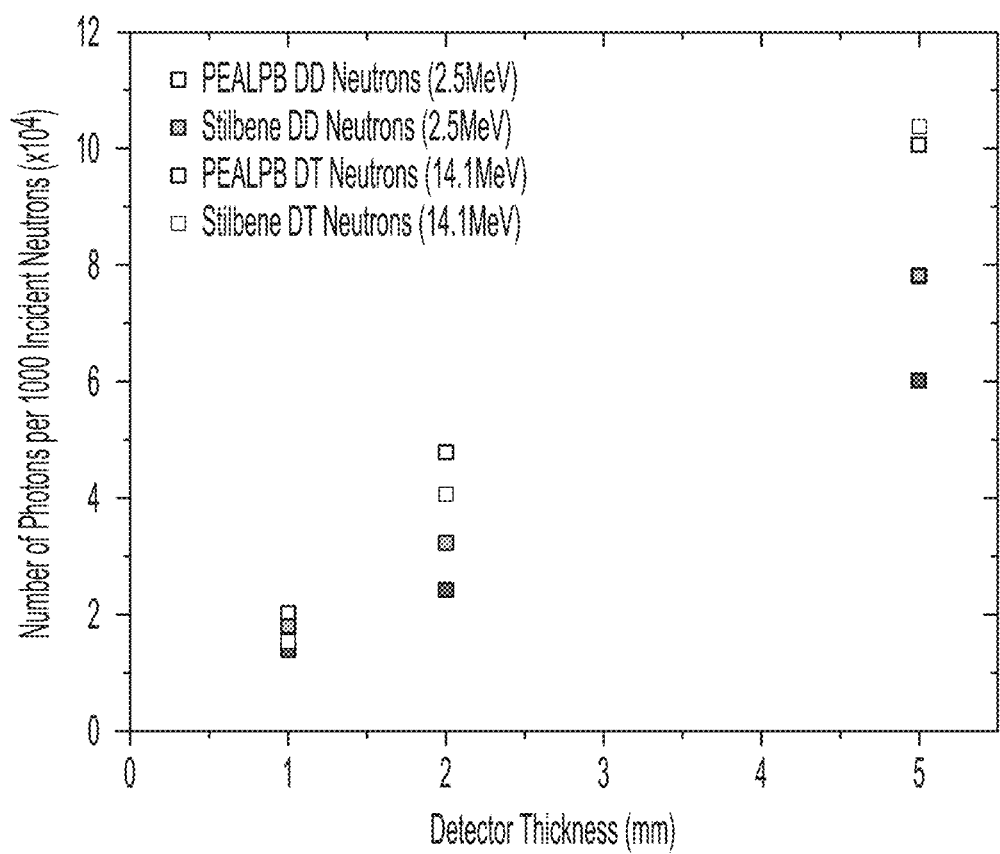
FIG. 14 shows the calculated number of photons collected by the imager shown in FIG. 13 after firing fast neutrons with an energy of 2.5 MeV at the imager.

FIG. 14 shows the calculated number of photons collected by the imager after firing fast neutrons with an energy of 2.5 MeV, to represent a Deuteron-Deuteron (DD) neutron source, and 14.1 MeV, to represent a DT neutron source, at a series of PEALPB detectors with varying thicknesses practical for radiography. As the thickness of the film increases, more fast neutrons are captured resulting in an increase in the number of photons captured by the imager. The performance of these devices was compared to the performance of stilbene devices of the same thickness (red), and it was observed that PEALPB devices, especially at lower thicknesses, are competitive with stilbene for fast neutron detection.

Figure 15A:
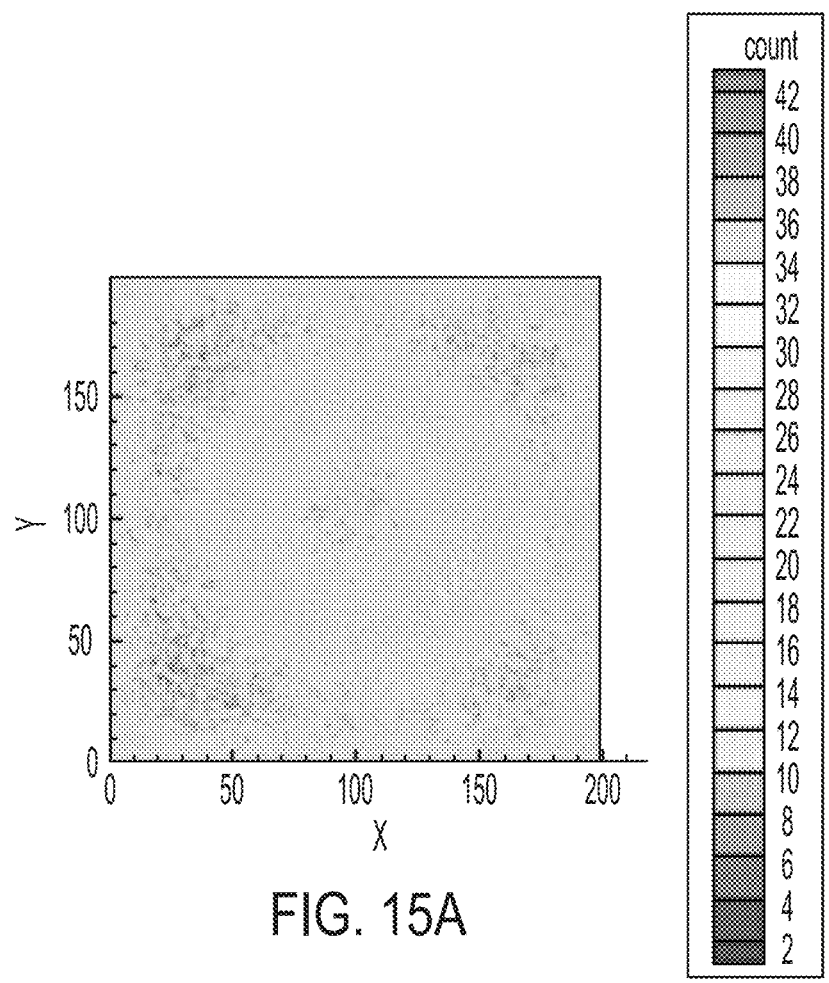
FIGS. 15A and 15B show the neutron detection simulation results.
Figure 15B:
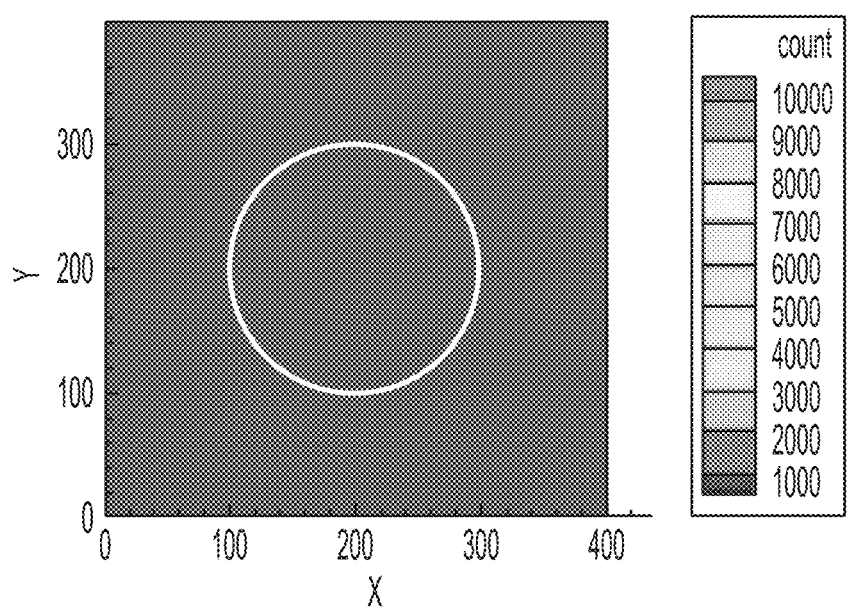

The thermal neutron results are shown in FIGS. 15A and 15B. The light generated by the thermal neutron sensitive PEALPB was confined to the microcapillaries due to total internal reflection resulting in a high spatial resolution.

Figure 16:
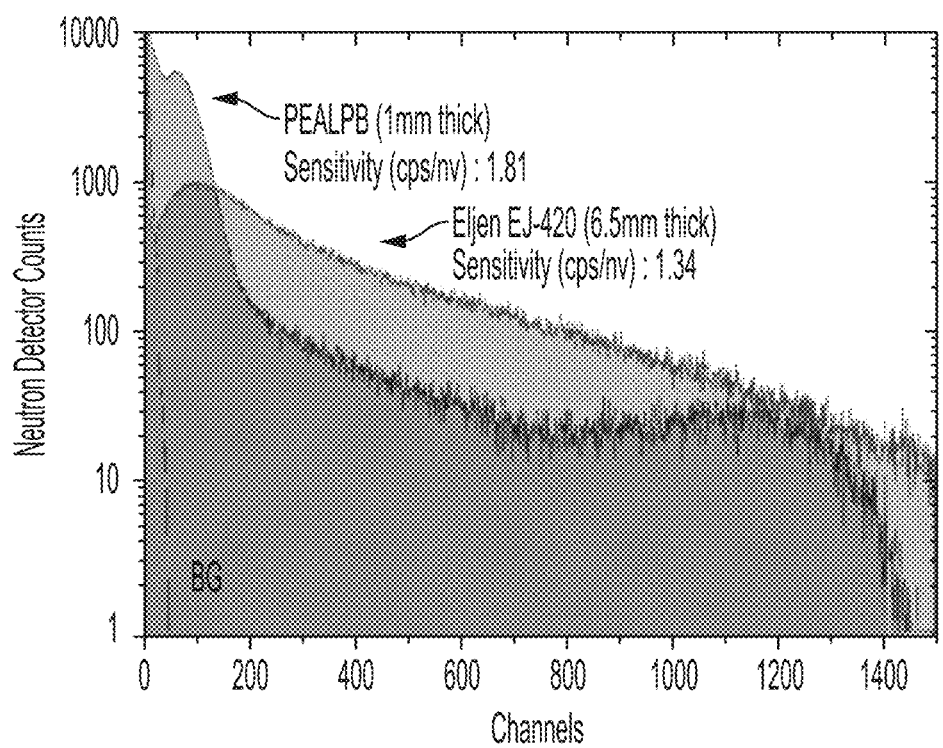
FIGS. 16 and 17 show the number of neuron detector counts for a plurality of detector channels, illustrating that the simulated neutron detection performance of detectors according to embodiments of the present teachings exceed the respective performance of commercial sensors.
Figure 17:
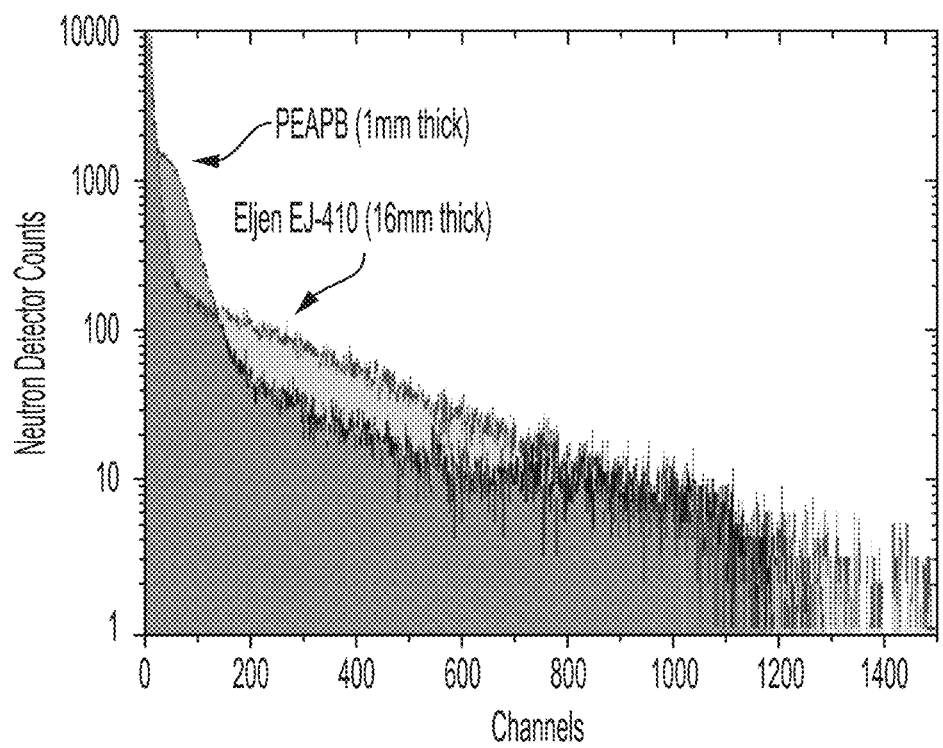

The neutron detection performance of these detectors in terms of neutron sensitivity exceeded that of the commercial sensors used for neutron radiography (See, e.g., FIGS. 16 and 17). For X-ray imaging, a camera was constructed using the 2 cm×2 cm microcapillary plates with the microcapillaries filled with single crystals of PEALPB, as shown in FIGS. 10A and 10B. A microcapillary diameter of 20 μm and a CMOS chip pixel pitch of 3.75 μm was used to construct this high spatial resolution indirect camera.

Figure 18A:
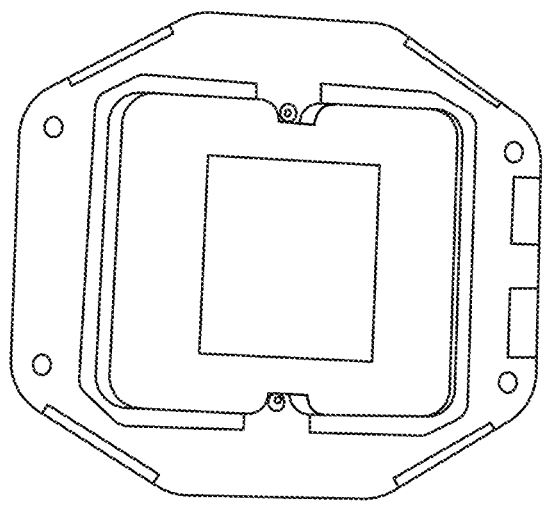
FIGS. 18A and 18B show a prototype imager according to an embodiment of the present teachings under UV irradiation, where the imager was constructed by coupling a PEALPB detector according to an embodiment of the present teachings to a CMOS sensor.
Figure 18B:
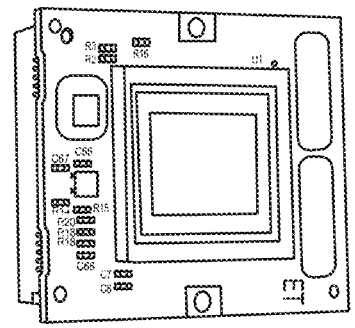

FIGS. 18A and 18B show the PEALPB detector and the CMOS chip, which were used to construct an image detector (herein also referred to as a camera) according to an embodiment of the present teachings, under UV irradiation. This camera was placed in line with a microfocus X-ray source, and the imaging objects were placed on an XYZ stage in between.

The properties of the CMOS chip used for fabricating the X-ray imaging camera are presented in Table 1 below:

TABLE 1

| | |
|---|---|
| Number of pixels | 4096 × 3000 |
| Optical format | 17.5 mm |
| Pixel size | 3.45 microns × 3.45 microns |
| Full well capacity | >10,650 e |
| Dynamic range | 71 dB |

Figure 19:
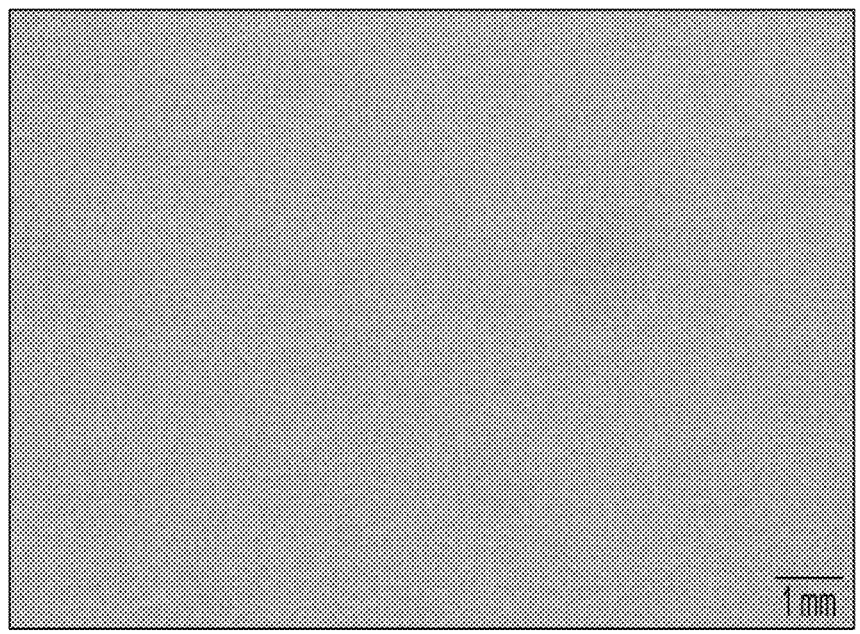
FIG. 19 shows a background X-ray image of the PEALPB camera obtained in absence of an imaging object positioned between an X-ray source and the imager.

First, the uniformity of the background was measured without any imaging object positioned between the camera and the X-ray source. The background image acquired using 90 kV X-ray is shown in FIG. 19. Seven regions of interests (ROIs) with 200×200 pixels were used to perform the uniformity analysis. The uniformity of the background image was found within 0.056% with about 4% noise. The detailed ROI statistics for these regions are provided in Table 2 below:

TABLE 2

| ROI | Mean | Standard Deviation |
|---|---|---|
| 1 | 157.19 | 47.82 |
| 2 | 156.86 | 47.92 |
| 3 | 157.76 | 48.98 |
| 4 | 156.02 | 46.47 |
| 5 | 156.24 | 47.81 |
| 6 | 155.43 | 46.93 |
| 7 | 157.45 | 48.58 |

Figure 20A:
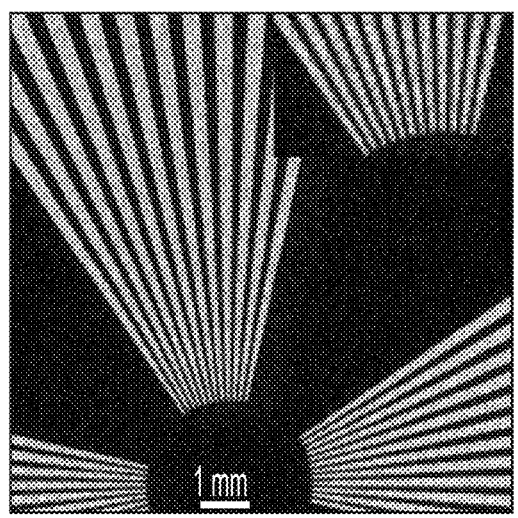
FIG. 20A shows X-ray resolution target images using Timepix camera with Si sensor.
Figure 20B:
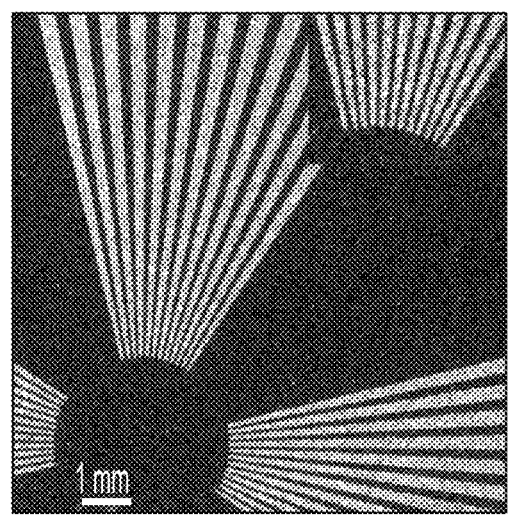
FIG. 20B shows X-ray resolution target images using PEALPB camera.
Figure 21B:
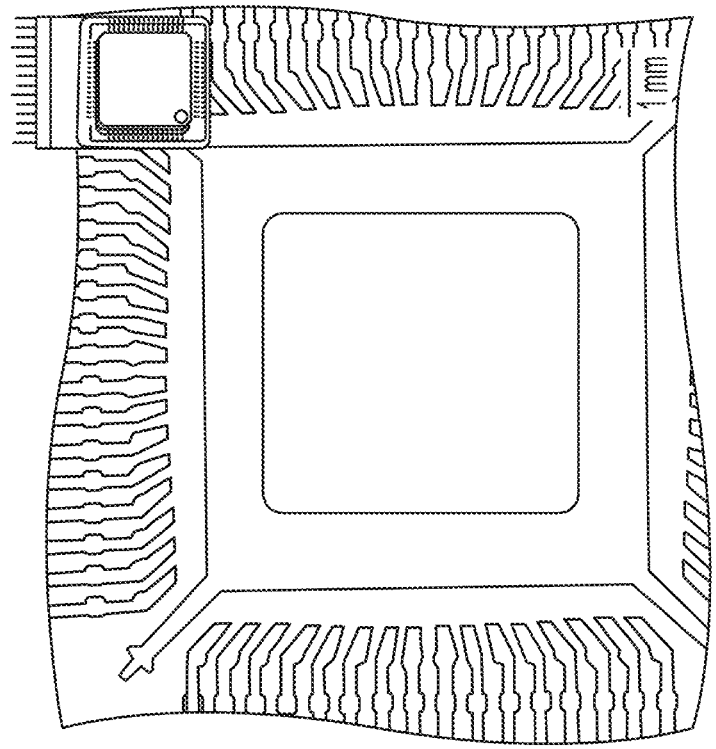
FIGS. 21A and 21B show X-ray images of a mini-USB drive circuit.
Figure 21A:
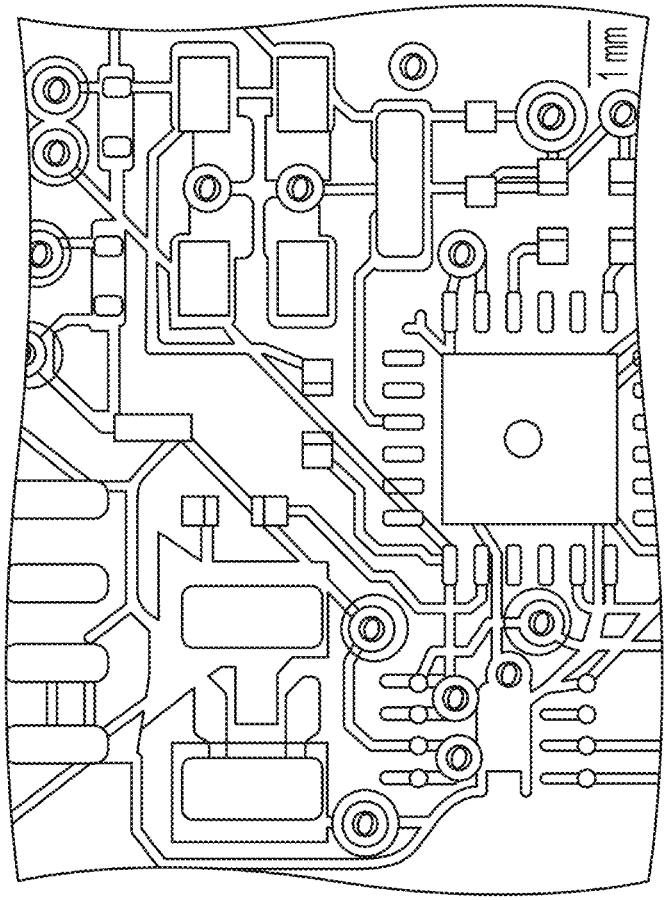

FIGS. 20A and 20B show the images of an X-ray resolution target taken using the PEALPB camera and a Timepix camera with a silicon sensor. The excellent spatial resolution of the PEALPB camera is evident. The relative contrast measured on the raw image for PEALPB at the lowest frequency of the X-ray resolution target gives an average of 491.7 compared to 531.8 for the Si detector. The signal-to-noise ratio (SNR) for this area is measured to be 78. FIGS. 21A and 21B show the X-ray image of a mini USB drive circuit. The tiniest features were well resolved.

Figure 22:
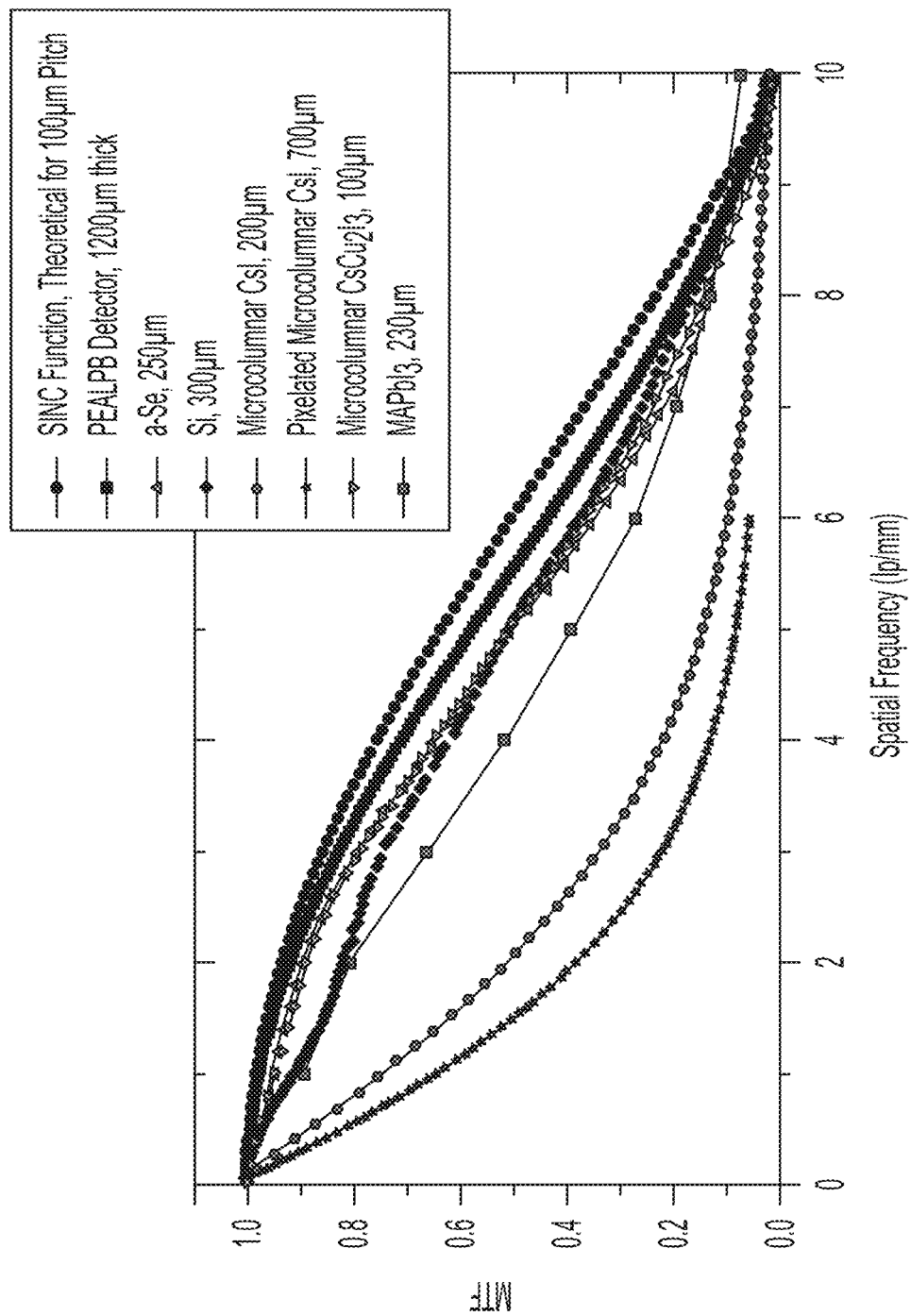
FIG. 22 shows the MTF versus spatial frequency plot derived from the PEALPB camera shown in FIG. 19.

The MTF of this detector was calculated using the slanted edge technique. FIG. 22 shows the MTF versus spatial frequency plot derived from the PEALPB camera. This figure also summarizes the MTF values for different other direct and indirect sensors. This comparison has not been done under the same experimental conditions (such as X-ray dose or energy). However, as these are the best-achieved values for these sensor materials, FIG. 22 clearly shows the enhanced spatial resolution of the microcapillary-based PEALPB detectors over the other state-of-the-art sensors.

For the best indirect sensor materials such as microcolumnar CsI or the newly discovered $CsCu_2I_3$ with microcolumnar structures, the MTF values decrease sharply with film thicknesses. In addition, for semiconductor detectors, increasing the thickness of the detector enhances charge trapping and detector noise resulting in reduced detector sensitivity and bandwidth.

In contrast, this example shows that with the microcapillary-based detector structure, even with thicknesses as high as 1.2 mm, the detector spatial resolution, as well as its sensitivity to X-rays, can be simultaneously well maintained.

The best available spatial frequencies with 10% and 50% MTF for different detectors are summarized in Table 3 below. Higher sensor thicknesses are necessary to increase the efficiency and sensitivity of the detectors. None of the existing technologies can provide a solution for fabricating detectors with higher thicknesses without adversely affecting the spatial resolution.

TABLE 3

| Detector | Detector Thickness (μm) | Spatial frequency at 10% MTF | Spatial frequency at 50% MTF |
|---|---|---|---|
| PEALPB (this example) | 1200 | 8.8 | 5.5 |
| Microcolumnar CsI | 200 | 6 | 2.1 |
| Pixelated Microcolumnar CsI | 700 | 4.6 | 1.5 |
| Microcolumnar CsCu2I3 | 100 | 8.7 | 5.4 |
| Timepix with Si | 300 | 8.6 | 5.1 |
| a-Se | 250 | 13 | 6.8 |
| MAPBI3 | 230 | 10 | 4.1 |

The data in FIG. 22 also shows that the multimodal X&N detector based on PEALPB can provide high spatial resolution matching an ideal camera with 100 μm pixels. The sinc function, defined as $$\mathrm{Sinc}(rf) = \frac{\mathrm{Sinc}(r\pi f)}{r\pi f},$$

where r and f represent the pixel pitch and spatial frequency, respectively, represents the theoretical limit of the MTF by assuming that the pixel aperture is the only image blurring mechanism in the radiography camera.

The data in FIG. 22 shows that some degree of light sharing or leakage can occur between each microcapillary and surrounding microcapillaries, resulting in some global average blurring imperfections in the detector's response. The expected Nyquist frequency for 20 μm microcapillaries is 25 lp/mm. To reduce the blurring, microcapillaries with extramural absorption were employed to further improve the detector's spatial resolution and obtain a high MTF at the Nyquist frequency. At 25 lp/mm, an MTF of 3.2% was obtained.

Figure 23:
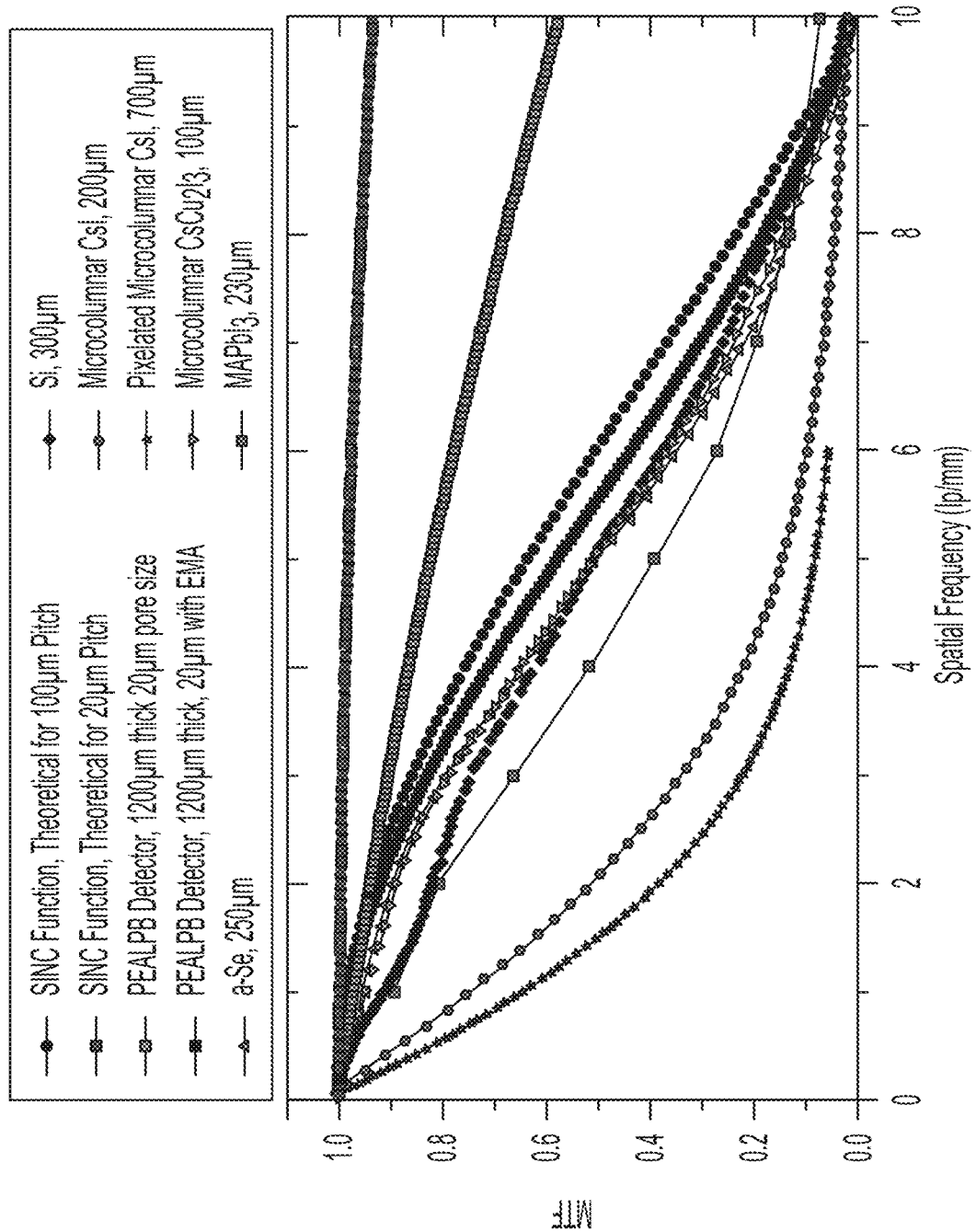
FIG. 23 shows the MTF plot for a microcapillary-based detector with extramural absorption layers.

FIG. 23 shows the MTF plot for the microcapillary-based detector with extramural absorption layers made of opaque glass. It shows an excellent spatial resolution greater than that exhibited by any conventional X-ray sensor. However, high X-ray doses were needed to generate these images where the darkening effect from the extramural pattern required extensive correction, thus rendering the use of absorption layers unsuitable for low-dose X-ray imaging.

The use of a pixelated CMOS or a-Si:H back planes is expected to further improve the spatial resolution of a detector according to the present teachings beyond that shown in this example.

Those having ordinary skill in the art will appreciate that various changes to the above embodiments can be made without departing from the scope of the present teachings.

What is claimed is:

1. A radiation detector, comprising:
a plurality of microcapillary structures,
wherein said microcapillary structures are at least partially filled with a radiation detecting material so as to provide a plurality of independent radiation sensing elements such that each of the radiation sensing elements is associated with one of said microcapillary structures for detecting incident radiation and generating one or more signals in response to the detection of the incident radiation, wherein the radiation detection material is initially dispersed into the microcapillary structures and then processed inside the microcapillary structures to form within the microcapillary structures the radiation sensing elements having a single crystalline structure or a polycrystalline structure, and wherein said radiation detecting material comprises a semiconductor material, wherein the semiconductor material is configured to generate electric charges in response to detection of the incident radiation, and wherein said radiation detecting material does not comprise a scintillator material.

2. The radiation detector of claim 1, wherein each of said microcapillary structures comprises a plurality of electrodes for collecting said electric charges generated by the semiconductor in response to detection of the incident radiation.

3. The radiation detector of claim 2, wherein the plurality of electrodes associated with each of said microcapillary structures comprises an anode electrode and a cathode electrode electrically coupled to opposed ends of the microcapillary structure.

4. The radiation detector of claim 2, wherein each of said plurality of electrodes comprises an electrically conductive layer coating at least a portion of an inner surface of a respective one of said microcapillary structures and being in electrical contact with the semiconductor material associated with that microcapillary structure.

5. The radiation detector of claim 1, wherein at least one of said microcapillary structures comprises a passivating, electrically insulating layer coating at least a portion of an inner surface thereof for reducing dark current associated with the semiconductor material.

6. The radiation detector of claim 1, wherein at least one of said microcapillary structures comprises an inner electrically insulating layer and an outer electrically conductive layer coating at least a portion of an inner surface thereof.

7. The radiation detector of claim 1, wherein said microcapillary structures are formed in a substrate.

8. The radiation detector of claim 7, wherein said substrate comprises any of glass, polymer, ceramic, metal or semiconductor material.

9. The radiation detector of claim 1, wherein said semiconductor material comprises any of silicon, Ge, CdZnTe, CdTe, $HgI_2$, $BiI_3$, TlBr, $CsPbBr_3$, $MAPbBr_3$, $MAPbI_3$, FAMACs.

10. A radiation detector, comprising:
a plurality of microcapillary structures formed in a substrate,
wherein said microcapillary structures are at least partially filled with a radiation detecting material so as to provide a plurality of independent radiation sensing elements such that each of the radiation sensing elements is associated with one of said microcapillary structures for detecting incident radiation and generating one or more signals in response to the detection of the incident radiation, wherein the radiation detection material is initially dispersed into the microcapillary structures and then processed inside the microcapillary structures to form the radiation sensing elements having a single crystalline structure or a polycrystalline structure,
wherein said radiation detecting material comprises a first scintillator material configured to generate scintillation radiation in response to detection of the incident radiation, and
wherein said substrate comprises a material exhibiting an index of refraction greater than an index of refraction of said first scintillator material at a frequency associated with the optical radiation such that the optical radiation generated in each of said sensing elements is substantially trapped within that sensing element via internal reflection at interfaces between said first scintillator material and said substrate material.

11. The radiation detector of claim 10, wherein said radiation detecting material has any of a single- and polycrystalline structure.

12. The radiation detector of claim 10, wherein said radiation detecting material has an amorphous structure.

13. The radiation detector of claim 10, wherein said incident radiation comprises any of $\alpha$, $\beta$, $\gamma$, X-ray and neutrons.

14. The radiation detector of claim 10, wherein said first scintillator material comprises any of an organic, an inorganic and an organic-inorganic hybrid scintillator material.

15. The radiation detector of claim 14, wherein said organic-inorganic hybrid scintillator material comprises any of 0D, 1D, 2D or 3D perovskite material.

16. The radiation detector of claim 10, wherein said substrate comprises a second scintillator material.

17. The radiation detector of claim 16, wherein said second scintillator material is different from said first scintillator material.

18. The radiation detector of claim 17, wherein said first and second scintillator materials are suitable for detection of different radiation modalities.

19. The radiation detector of claim 10, wherein at least one of said channels comprises a coating layer covering at least a portion of an inner surface thereof for enhancing photon generation in response to the incoming radiation and enhancing optical isolation between said at least one channel and an adjacent channel.

20. The radiation detector of claim 10, wherein at least one of said microcapillary structures comprises a wavelength shifting material coating at least a portion of an internal surface thereof.

21. The radiation detector of claim 10, wherein said plurality of microcapillary structures comprises at least two subsets having different scintillator materials.

22. The radiation detector of claim 10, wherein said plurality of radiation sensing elements are distributed in two or more stacked layers.

23. The radiation detector of claim 22, wherein the radiation sensing elements associated with at least two of said layers include different scintillator materials.

24. The radiation detector of claim 10, further comprising an optical imager optically coupled to said independent radiation sensing elements to receive the scintillation radiation to generate an image corresponding to the incident radiation.

25. The radiation detector of claim 24, wherein said image exhibits a modulation transfer function (MTF) of at least 5% for detection of the incident radiation.

26. The radiation detector of claim 2, further comprising a detection and analysis circuitry electrically coupled to said radiation detecting elements for receiving the electrical signals generated by the electrodes of said radiation detecting elements and analyzing the electrical signals to generate an image of the incident radiation.

27. The radiation detector of claim 26, wherein said radiation detector and said detection and analysis circuitry are configured such that said image exhibits a modulation transfer function (MTF) of at least 5% for detection of said incident radiation.

* * * * *